(12) United States Patent
Wang et al.

(10) Patent No.: US 11,757,619 B2
(45) Date of Patent: Sep. 12, 2023

(54) GENERATING SEQUENCES OF NETWORK DATA WHILE PREVENTING ACQUISITION OR MANIPULATION OF TIME DATA

(71) Applicant: GOOGLE LLC, Mountain View, CA (US)

(72) Inventors: Gang Wang, Jersey City, NJ (US); Marcel M. Moti Yung, New York, NY (US)

(73) Assignee: Google LLC, Mountain View, CA (US)

( * ) Notice: Subject to any disclaimer, the term of this patent is extended or adjusted under 35 U.S.C. 154(b) by 78 days.

(21) Appl. No.: 17/617,075

(22) PCT Filed: Dec. 14, 2020

(86) PCT No.: PCT/US2020/064806
§ 371 (c)(1),
(2) Date: Dec. 7, 2021

(87) PCT Pub. No.: WO2021/158287
PCT Pub. Date: Aug. 12, 2021

(65) Prior Publication Data
US 2022/0239464 A1  Jul. 28, 2022

(30) Foreign Application Priority Data

Feb. 6, 2020 (IL) .......................................... 272521

(51) Int. Cl.
*H04L 29/06* (2006.01)
*H04L 9/00* (2022.01)
(Continued)

(52) U.S. Cl.
CPC .............. *H04L 9/008* (2013.01); *H04L 9/085* (2013.01); *H04L 9/3257* (2013.01);
(Continued)

(58) Field of Classification Search
None
See application file for complete search history.

(56) References Cited

U.S. PATENT DOCUMENTS 7,929,688 B2 * 4/2011 Yamamichi ........... H04L 9/3093
380/1
8,930,706 B2 * 1/2015 Pujante Cuadrupani ....................
H04W 12/106
713/176
(Continued)

FOREIGN PATENT DOCUMENTS

EP          3506550         7/2019
WO     WO-2018031597 A1 *  2/2018

OTHER PUBLICATIONS

Office Action in Indian Appln. No. 202127056598, dated Sep. 8, 2022, 6 pages (with English translation).
(Continued)

*Primary Examiner* — Maung T Lwin
(74) *Attorney, Agent, or Firm* — Fish & Richardson P.C.

(57) ABSTRACT

Methods, systems, and apparatus, including a method for determining network measurements. In some aspects, a method includes receiving, by a first aggregation server and from each of multiple client devices, encrypted impression data. A second aggregation server receives, from each of at least a portion of the multiple client devices, encrypted conversion data. The first aggregation server and the second aggregation server perform a multi-party computation process to generate chronological sequences of encrypted impression data and encrypted conversion data and to decrypt the encrypted impression data and the encrypted conversion data.

20 Claims, 10 Drawing Sheets

(51) Int. Cl.
  *H04L 9/08* (2006.01)
  *H04L 9/32* (2006.01)
(52) U.S. Cl.
  CPC ........ *H04L 9/3297* (2013.01); *H04L 2209/42* (2013.01); *H04L 2209/46* (2013.01)

(56) References Cited

U.S. PATENT DOCUMENTS

| | | | | |
|---|---|---|---|---|
| 2007/0288758 A1* | 12/2007 | Weiss | ............ | H04W 12/06 713/186 |
| 2017/0235848 A1* | 8/2017 | Van Dusen | ............ | G06F 16/904 705/12 |
| 2019/0205568 A1* | 7/2019 | Veugen | ............ | H04L 9/085 |
| 2020/0044870 A1* | 2/2020 | Cunningham | ............ | H04L 9/3271 |

OTHER PUBLICATIONS

Notice of Allowance in Israel Appln. No. 272521, dated Sep. 5, 2022, 3 pages.
Notice of Allowance in Japanese Appln. No. 2021-573237, dated Nov. 28, 2022, 6 pages (with English translation).
Archer et al., "From Keys to Databases—Real World Applications of Secure Multi-Party Computation," IACR, International Association for Cryptologic Research, vol. 20181128:124403, Nov. 28, 2018, 32 pages, retrieved on Nov. 28, 2018, retrieved from URL: http://eprint/iacr.org/2018/450.pdf.
Gajek et al., "Trustless, Censorship-Resilient and Scalable Votings in the Permission-based Blockchain Model," IACR, International Association for Cryptologic Research, vol. 20190603:070557, Jun. 1, 2019, 24 pages, retrieved on Jun. 3, 2019, retrieved from URL:http://eprint.iacr.org/2019/617.pdf.
International Preliminary Report on Patentability in International Appln. No. PCT/US2020/064806, dated Aug. 18, 2022, 9 pages.
International Search Report and Written Opinion in International Appln. No. PCT/US2020/064806, dated Apr. 7, 2021, 16 pages.
Office Action in Japanese Appln. No. 2021-573237, dated Aug. 15, 2022, 6 pages (with English translation).
Veugen et al., "Efficient coding for secure computing with additively-homomorphic encrypted data," IACR, International Association for Cryptologic Research, vol. 20190503:121743, May 3, 2019, 15 pages, retrieved on Apr. 29, 2019, retrieved from URL:http://eprint.iacr.org/2019/437.pdf.
Notice of Allowance in European Appln. No. 20838825.6, dated Dec. 1, 2022, 9 pages.

\* cited by examiner

GENERATING SEQUENCES OF NETWORK DATA WHILE PREVENTING ACQUISITION OR MANIPULATION OF TIME DATA

CROSS-REFERENCE TO RELATED APPLICATIONS

This application is a National Stage Application under 35 U.S.C. § 371 and claims the benefit of International Application No. PCT/US2020/064806, filed Dec. 14, 2020, which claims priority to IL Application No. 272521, filed Feb. 6, 2020, entitled GENERATING SEQUENCES OF NETWORK DATA WHILE PREVENTING ACQUISITION OR MANIPULATION OF TIME DATA. The disclosures of the foregoing applications are incorporated herein by reference in their entirety.

BACKGROUND

Client devices transmit data over public networks, such as the Internet. These communications can be intercepted and/or altered by entities other than the intended recipient. In addition, entities can forge network identifies and send data that appears to originate from these forged network identities. An example of such forging is a Sybil attack in which an entity creates network identifies to subvert a reputation system of a peer-to-peer network.

SUMMARY

This specification describes technologies relating to determining network measurements in ways that prevent fraud and protects user privacy.

In general, one innovative aspect of the subject matter described in this specification can be embodied in methods that include receiving, by a first aggregation server and from each of multiple client devices, impression data that includes, for each impression of a digital component recorded by the client device, (i) a first join key that is based on a first unique identifier for the client device or an application on the client device at which the impression occurred, (ii) encrypted impression data that has been encrypted using a first public key of the first aggregation server and using a second public key of a second aggregation server different from the first aggregation server, and (iii) encrypted impression time data that indicates a time at which the impression occurred; receiving, by the second aggregation server and from each of at least a portion of the multiple client devices, conversion data that includes, for each conversion recorded by the client device, (i) a second join key that is based on a second unique identifier for the client device or an application on the client device at which the conversion occurred and (ii) a second value comprising encrypted conversion data that has been encrypted using the first encryption key and the second encryption key, and (iii) encrypted conversion time data that indicates a time at which the conversion occurred; performing, by the first aggregation server and the second aggregation server, a multi-party computation process to generate chronological sequences of encrypted impression data and encrypted conversion data and to decrypt the encrypted impression data and the encrypted conversion data, including: identifying, based on the first keys and the second keys, groups of encrypted conversion data and corresponding encrypted impression data; and ordering, for each chronological sequence, the encrypted conversion data and the corresponding encrypted impression data based on the encrypted impression time data and the encrypted conversion time data; and decrypting the impression data and the conversion data for each sequence of encrypted impression data and conversion data in multiple stages using a first private key that corresponds to the first public key and a second private key that corresponds to the second public key. Other implementations of this aspect include corresponding apparatus, systems, and computer programs, configured to perform the aspects of the methods, encoded on computer storage devices. Advantageously, this provides a means for conversion data to be attributed to impression data whilst maintaining user privacy and therefore providing a more secure system/method. As described herein, conversion data corresponds to a user interaction with a digital component, whilst impression data corresponds to the provision of the digital component to the user. Thus, reconciling impression and conversion data by attributing conversions to corresponding impressions is beneficial for monitoring user interactions with digital components that are provided to the user. It is often important to provide a secure system that maintains user privacy when monitoring such interactions, such that users are not able to be identified or tracked based on conversion or impression data. The disclosed techniques provide a technical effect by enabling user privacy to be maintained when reconciling impression and conversion data, and also provide a technical effect of preventing fraudulent activity when reconciling impression and conversion data. Specifically, the encryption techniques recited above prevent third parties from intercepting sensitive impression or conversion data that could lead the party back to the user. Additionally, these encryption techniques also prevent all entities involved in the above method from learning information about users (e.g. by matching impression and conversion data for a specific user), and thus prevents users from being tracked based on impression or conversion data. For example, as recited above, the impression data and conversion data have each been doubly-encrypted using a first public key of a first aggregation server and a second public key of a second aggregation server. This particular feature serves to improve security and protect user privacy since the encrypted impression data and conversion data requires both of the aggregation servers to decrypt (i.e., using their respective private keys). In this way, one server alone (or an intercepting party) is unable to obtain the plaintext impression or conversion data, thus improving security. Thus, the disclosed techniques solve a technical problem of providing a secure system for monitoring user interactions with digital components that enables user privacy to be maintained.

It is also often important to prevent fraud (e.g. emulating false user interactions with digital components) when monitoring user interactions with digital components and when reconciling impression and conversion data. The use of multiple aggregation servers to form multi-party computation (MPC) enables each server to check the other for signs of fraudulent activity (for example if one of the servers is compromised or colludes with other entities), and prevents fraud in the measurements. Thus a further technical effect is enabled by the disclosed techniques of preventing fraudulent activity when reconciling impression and conversion data, at the same time as maintaining user privacy.

In addition, the disclosed techniques enable more flexibility for user interactions with digital components. Specifically, using join keys as recited above that are based unique identifiers for the client device or an application enables same-platform or cross-platform user interactions to be monitored (i.e., impressions and conversions occur via the same or different web browsers or other applications on the user device).

In addition, the features of generating chronological sequences by identifying groups of encrypted conversion data and corresponding encrypted impression data; and ordering, for each chronological sequence, the encrypted conversion data and the corresponding encrypted impression data based on the encrypted impression time data and the encrypted conversion time data enables increased accuracy in the attribution of conversions to corresponding impressions. This is because the conversions are attributed to impressions based on the respective time data for the conversions and impressions, meaning that user interactions with digital components can be monitored more accurately.

These and other implementations can each optionally include one or more of the following features. In some aspects, the encrypted impression time data is encrypted using the first public key and the second public key. The encrypted impression time data can include an encrypted version of a sum of the time at which the impression occurred and a clock skew of the client device at which the impression occurred. The sum of the time at which the impression occurred and the clock skew of the client device at which the impression occurred can be encrypted using homomorphic, additive, probabilistic public key encryption.

In some aspects, the encrypted conversion time data is encrypted using the first public key and the second public key. The encrypted conversion time data comprises an encrypted version of a sum of the time at which the conversion occurred and a clock skew of the client device at which the conversion occurred. The the sum of the time at which the conversion occurred and the clock skew of the client device at which the conversion occurred is encrypted using homomorphic, additive, probabilistic public key encryption. Similar to the double encryption of the impression and/or conversion date, the double encryption of the impression time data and/or conversion time data is advantageous as this improves security. The double-encrypted time data requires the private keys of both aggregation servers to decrypt. In this way, one server alone (or an intercepting party) is unable to obtain the plaintext time-data, mitigating the risk of a time-interval based attack and thus improving security. The use of the clock skew in the encrypted impression and/or conversion time data is particularly useful for distinguishing between same-device conversion and cross-device conversion. As described herein, if conversion and impression occurs on the same device, the clock skew of the device for each of the conversion and impression is the same but is unknown to the aggregation server (since it is encrypted. If conversion and impression occur on different devices, then the clock skew of each device is different. In either case, the encryption of a sum of the time at which the impression/conversion occurred and a clock skew of the client device at which the impression/ conversion occurred provides a technical effect of improved security as these features make it more difficult to launch a time interval-based attack to obtain user information or commit fraud.

Some aspects can include, for each chronological sequence of encrypted impression data and encrypted conversion data, attributing credit for a conversion in the encrypted conversion data to each impression of the encrypted impression data based at least in part on the chronological sequence of encrypted impression data and encrypted conversion data.

In some aspects, performing the multi-party computation process includes, for each impression, encrypting, by the first aggregation server, the first join key, sending, by the first aggregation server and to the second aggregation server, a tuple including the encrypted first join key, the encrypted impression data, and the encrypted impression time data; and for each conversion, encrypting, by the second aggregation server, the second join key, and sending, by the second aggregation server and to the first aggregation server, a tuple including the encrypted second join key, the encrypted conversion data, and the encrypted conversion time data.

In some aspects, performing the multi-party computation process includes decrypting, by the first aggregation server, each encrypted conversion time data; determining, by the first aggregation server, a first time skew value; generated second encrypted conversion time data by encrypting a sum of the time at which the conversion occurred, a clock skew of the client device at which the conversion occurred, and the first time skew value; determining, by the first aggregation server, for each unique encrypted conversion data, a number of unique second join keys; and filtering, from a set of encrypted conversion data received by the first aggregation server, each encrypted conversion data for which the number of unique second join keys is less than a threshold; and providing, for each remaining encrypted conversion data in the set of encrypted conversion data, a tuple of data that includes the second join key for the encrypted conversion data, the encrypted conversion data, and the second encrypted conversion time data. The step of filtering recited above provides a technical effect of increasing data security, since each encrypted conversion data requires a threshold number of unique first join keys, otherwise the data is filtered out. This serves to improve the protection of user privacy as this makes it difficult to track-back to a specific user based on the conversion data (because the remaining un-filtered impression data is associated with at least the threshold number of join keys), thereby improving anonymity associated with the conversion data.

In some aspects, performing the multi-party computation process includes decrypting, by the second aggregation server, each encrypted impression time data; determining, by the second aggregation server, a second time skew value; generated second encrypted impression time data by encrypting a sum of the time at which the impression occurred, a clock skew of the client device at which the impression occurred, and the second time skew value; determining, by the second aggregation server, for each unique encrypted conversion data, a number of unique first join keys; filtering, from a set of encrypted impression data received by the second aggregation server, each encrypted impression data for which the number of unique first join keys is less than a threshold; and providing, for each remaining encrypted conversion data in the set of encrypted impression data, a tuple of data that includes the first join key for the encrypted impression data, the encrypted conversion data, and the second encrypted impression time data. The step of filtering recited above provides a technical effect of increasing data security, since each encrypted impression data requires a threshold number of unique first join keys, otherwise the data is filtered out. This serves to improve the protection of user privacy as this makes it difficult to track-back to a specific user based on the impression data (because the remaining un-filtered impression data is associated with at least the threshold number of join keys), thereby improving anonymity associated with the impression data.

The subject matter described in this specification can be implemented in particular embodiments so as to realize one or more of the following advantages. Cryptographic techniques described in this document enable the computation of measurements of various types of data, while protecting user privacy and preventing fraudulent manipulations of the data. For example, the techniques can enable the computation of measurements of impressions, various types of conversions, and the aggregated values of the conversions, while protecting user privacy and preventing fraud in conversion reporting and impressions reporting. For example, the techniques can be used to compute click-through conversions, view-through conversions, application download conversions, cross-device conversions in which the conversion occurs at a different device from the device at which the impression occurred, and application to web conversions in which the impression occurred in an application and the conversion occurred in a browser (or vice versa) while protecting user privacy and preventing fraud. The techniques also support various attribution models, such as last click attribution, data-driven and multi-touch attribution, with the same protections.

The use of multiple aggregation servers to form multi-party computation (MPC) enables each server to check the other for signs of fraudulent activity and ensures that no single server can access any user data in plaintext at any time. Using MPC combined with k-anonymity techniques, differential privacy techniques, public key encryption, and additive/commutative homomorphic encryption techniques as described in this document protects user privacy even if one of the servers is compromised or colludes with other entities, and prevents fraud in the measurements. Using blind signature techniques to blindly sign the network data enables such data to be checked for fraud while protecting user privacy by not passing unblind data to other entities. Portions of data elements that include network data can be blindly signed and/or encrypted by multiple entities to prevent fraud or collusion from the multiple entities. As described herein, blinded data (e.g. impression data or conversion data) is data that has been blinded using a cryptographic technique. Blinded data is disguised such that an entity cannot ascertain the plaintext data from the blinded data. An entity can blindly sign data (e.g. a fraud detection system that determines that an impression is valid, can sign blinded impression data) to verify the legitimacy of that data, but the signing entity can sign the data without actually seeing the plaintext data. Thus a fraud detection server can be used to check for fraud whilst user privacy is not compromised, because the fraud detection server or any other intercepting party cannot see the plain impression data.

Various features and advantages of the foregoing subject matter is described below with respect to the figures. Additional features and advantages are apparent from the subject matter described herein and the claims.

BRIEF DESCRIPTION OF THE DRAWINGS

Like reference numbers and designations in the various drawings indicate like elements.

DETAILED DESCRIPTION

In general, this document describes cryptographic techniques for preventing fraud in determining event-level and aggregated network measurements. For example, the techniques described in this document can prevent fraud in determining event-level and aggregated impression and conversion measurements for digital components for various types of conversions. The cryptographic techniques described in this document can also protect user privacy, e.g., by preventing all entities from being able to track or aggregate user data received from client devices of users.

Overview of the System

Figure 1:
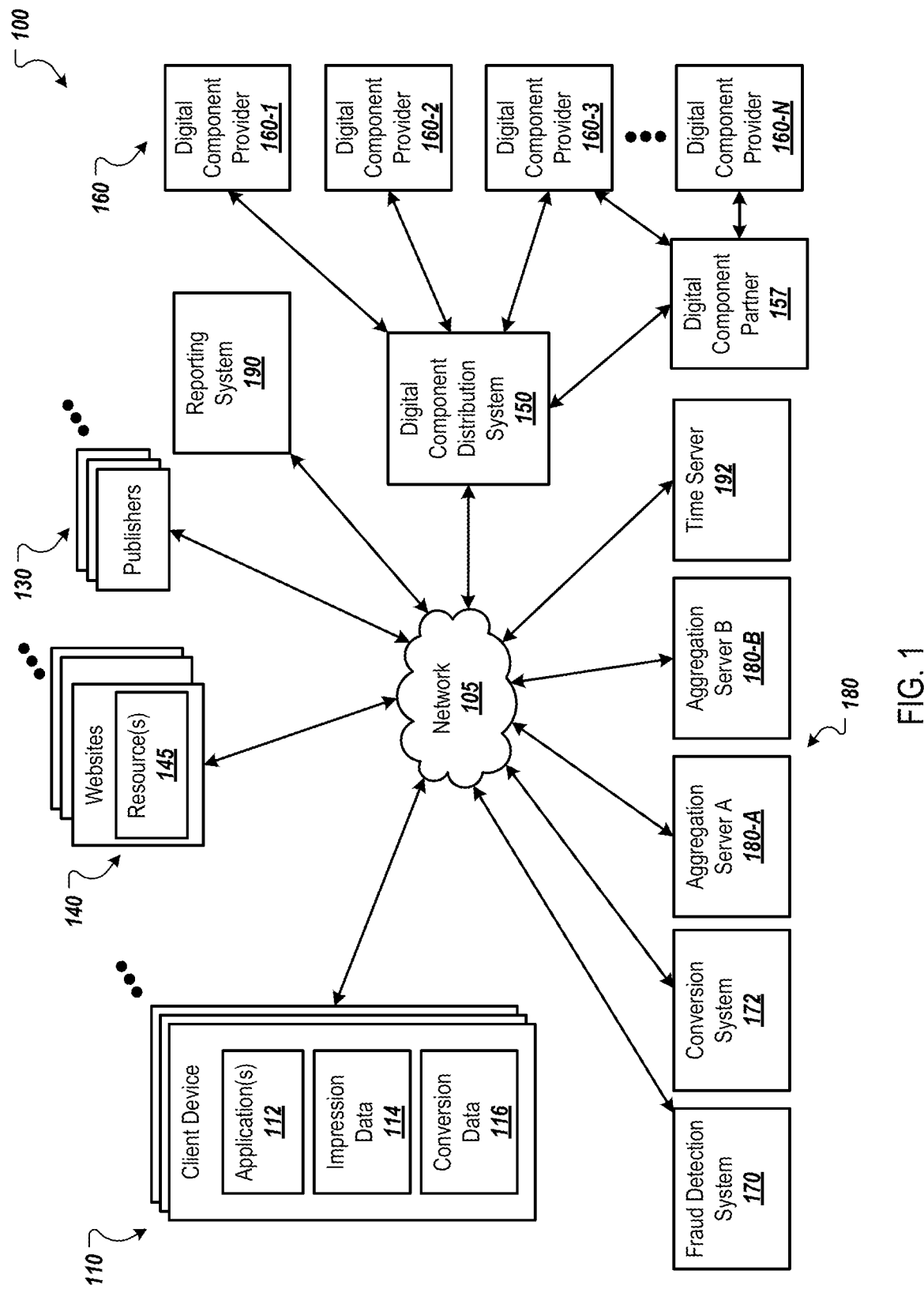
FIG. 1 is a block diagram of an example environment in which aggregation servers determine aggregated network measurements.

FIG. 1 is a block diagram of an example environment 100 in which aggregation servers 180 determine aggregated network measurements. The example environment 100 includes a data communication network 105, such as a local area network (LAN), a wide area network (WAN), the Internet, a mobile network, or a combination thereof. The network 105 connects client devices 110, publishers 130, websites 140, a digital component distribution system 150, a fraud detection system 170, a conversion system 172, the aggregation servers 180, a reporting system 190, and a time server 192. The example environment 100 may include many different client devices 110, publishers 130, and websites 140. In some implementations, the environment 100 can also include multiple digital component distribution systems 150, fraud detection systems 170, conversions systems 172, and reporting systems 190. Although there are two aggregation servers 180-A and 180-B in this example, more than two aggregation servers 180-A and 180-B can also be used as described below.

A website 140 is one or more resources 145 associated with a domain name and hosted by one or more servers. An example website is a collection of web pages formatted in HTML that can contain text, images, multimedia content, and programming elements, such as scripts. Each website 140 is maintained by a publisher 130, which is an entity that controls, manages and/or owns the website 140.

A resource 145 is any data that can be provided over the network 105. A resource 145 is identified by a resource address, e.g., a Universal Resource Locator (URL), that is associated with the resource 145. Resources include HTML pages, word processing documents, and portable document format (PDF) documents, images, video, and feed sources, to name only a few. The resources can include content, such as words, phrases, images and sounds, that may include embedded information (such as meta-information in hyperlinks) and/or embedded instructions (such as scripts).

A client device 110 is an electronic device that is capable of communicating over the network 105. Example client devices 110 include personal computers, mobile communication devices, e.g., smart phones, and other devices that can send and receive data over the network 105.

A client device 110 typically includes applications 112, such as web browsers and/or native applications, to facilitate the sending and receiving of data over the network 105. A native application is an application developed for a particular platform or a particular device. Publishers 130 can develop and provide, e.g., make available for download, native applications to the client devices 110. In some implementations, the client device 110 is a digital media device, e.g., a streaming device that plugs into a television or other display to stream videos to the television. The digital media device can also include a web browser and/or other applications that stream video and/or present resources.

A web browser can request a resource 145 from a web server that hosts a website 140 of a publisher 130, e.g., in response to the user of the client device 110 entering the resource address for the resource 145 in an address bar of the web browser or selecting a link that references the resource address. Similarly, a native application can request application content from a remote server of a publisher 130.

Some resources 145, application pages, or other application content can include digital component slots for presenting digital components with the resources 145 or application pages. As used throughout this document, the phrase "digital component" refers to a discrete unit of digital content or digital information (e.g., a video clip, audio clip, multimedia clip, image, text, or another unit of content). A digital component can electronically be stored in a physical memory device as a single file or in a collection of files, and digital components can take the form of video files, audio files, multimedia files, image files, or text files and include advertising information, such that an advertisement is a type of digital component. For example, the digital component may be content that is intended to supplement content of a web page or other resource presented by the application 112. More specifically, the digital component may include digital content that is relevant to the resource content (e.g., the digital component may relate to the same topic as the web page content, or to a related topic). The provision of digital components by the digital component distribution system 150 can thus supplement, and generally enhance, the web page or application content.

When the application 112 loads a resource 145 (or application content) that includes one or more digital component slots, the application 112 can request a digital component for each slot from the digital component distribution system 150. The digital component distribution system 150 can, in turn request digital components from digital component providers 160. The digital component providers 160 are entities that provide digital components for presentation with resources 145.

In some cases, the digital component distribution system 150 can also request digital components from one or more digital component partners 157. A digital component partner 157 is an entity that selects digital components on behalf of digital component providers 160 in response to digital component requests.

The digital component distribution system 150 can select a digital component for each digital component slot based on various criteria. For example, the digital component distribution system 150 can select, from the digital components received from the digital component providers 160 and/or the digital component partners 157, a digital component based on relatedness to the resource 145 (or application content), performance of the digital component (e.g., a rate at which users interact with the digital component), etc. The digital component distribution system 150 can then provide the selected digital component(s) to the client device 110 for presentation with the resource 145 or other application content.

When the application 112 presents a digital component, the application 112 (which could be a browser) can store impression data 114 for the presentation of the digital component. The impression data 114 for a particular presentation of a digital component can include a URL or domain of a landing page for the digital component (e.g., a page linked to by the digital component and when the user clicks or interacts with the digital component, the application/browser presents the page to the user), one or more identifiers for the digital component, event-level data associated with the impression, an expiration time that specifies when the impression data is to be deleted from the client device 110, and/or a reporting URL or domain to which conversion reports for the digital component are to be sent. This data can be provided by the digital component, e.g., as metadata of the digital component or an anchor tag of the digital component. As described in more detail below, rather than storing or in addition to storing raw impression data for each impression of a digital component, the application 112 can store impression data that is blindly signed by the fraud detection system 170.

The application 112 can also store conversion data 116 in response to a conversion being detected. A conversion for a digital component is the completion of a specified user action after the digital component is presented to and/or interacted with by the user. The conversion data 116 for a conversion can include data that indicates a type of the conversion as there are multiple types of conversions for various conversion measurement needs. The type of a conversion can specify a subsequent action after the conversion is completed. For example, a conversion may be the addition of an item to an online shopping cart. In this example, a first type of conversion may be the addition of the item without checking out (e.g., not completing a purchase) and a second type of conversion may be the addition of the item with checking out. As described in more detail below, the conversion data for a conversion can be a set of one or more bits that indicate the type of conversion and the application can store conversion data that is blindly signed by the digital component distribution system 150 (or the conversion system where the conversion actually occurs).

The fraud detection system 170, which can be implemented as one or more servers, can evaluate fraud signals received from the client device 110 and or applications 112 to determine whether an impression is valid or fraudulent. As described below, the fraud detection system 170 can also determine, based on fraud signals received from the conversion system 172, whether a conversion is valid or fraudulent. The fraud signals can be dependent on the application and can vary in different implementations.

At impression time, the application 112 (or the operating system on client device 110) can collect the fraud detection signals and provide the fraud detection signals to the fraud detection system 170. In addition to the fraud detection signals, the application 112 can send blinded impression data for the impression to the fraud detection system 170. Blinded impression data is impression data that has been blinded (e.g., disguised) using a cryptographic technique. If the fraud detection system 170 determines that the impression is valid, the fraud detection system 170 can sign the blinded impression data and provide the signed blinded impression data to the application 112. Example techniques for generating blinded impression data and signing the blinded impression data are described below.

The fraud detection system 170 can be operated by a digital component distribution system 150. In some implementations, the fraud detection system 170 is operated by one or more third parties. For example, application providers, e.g., entities that develop and provide web browsers or native applications, and/or digital component distributors that operate digital component distribution systems 150 can certify one or more third parties to operate the fraud detection system 170 to detect fraud and blindly sign blinded data received from applications (e.g., web browsers and/or native applications) of multiple different developers.

The conversion system 172, which can be implemented as one or more servers, can determine whether a conversion occurred. For example, each digital component provider 160 can operate a conversion system 172 that determines whether conversions occur for its digital components. In a particular example, the conversion can be the acquisition of a product at a website. In this example, the conversion system 172 and website may be maintained by a distributor of the product. The conversion system 172 can receive, from the web server that hosts the website, data specifying that a product was acquired and determine based on the data that a conversion occurred.

In another example, a conversion can be the downloading of an application. In this example, when the application is downloaded to a client device 110, the application store can provide, to the conversion system 172 of the application developer, data specifying that the application was downloaded to the client device 110. In some implementations, the application store also operates the conversion system 172.

The conversion system 172 can also interact with the fraud detection system 170 to determine whether a conversion was valid or fraudulent. For example, the conversion system 172 can provide, to the fraud detection system 170, blinded conversion data and fraud detection signals. Blinded conversion data is conversion data that has been blinded (e.g., disguised) using a cryptographic technique. If the fraud detection system 170 determines that the conversion is valid and/or the user interaction is genuine the fraud detection system 172 can sign the blinded conversion data and provide the signed blinded conversion data to the application 112. Example techniques for generating blinded conversion data and signing the blinded conversion data are described below.

The aggregation servers 180 can generate aggregated network measurements based on data received from client devices 110. The aggregation servers 180 can generate impression and/or conversion counts for various types of conversions based on the data received from the client devices 110. For example, the aggregation servers 180 can determine, for digital components, counts of click-through conversions, view-through conversions, application download conversions, cross-device conversions, and application to web conversions, and web to application conversions, while protecting user privacy and preventing fraud. As described below, the aggregation servers 180 implement an MPC protocol and uses commutative encryption techniques to protect user privacy and prevent fraud in determining and reporting the network measurements.

A click-through conversion is a conversion in which a user interacts with a digital component and the user subsequently completes a specific action. A view-through conversion is a conversion in which a digital component is presented to a user and the user subsequently completes a specific action. An application download conversion is a conversion in which a digital component is presented to a user and the user subsequently downloads an application referenced, e.g., promoted by, the presented digital component. In this example, the download of the application is the specific action. A cross-device conversion is a conversion in which the specific action occurs at a different device from the device at which the digital component was presented. An application to web conversions is a conversion in which the impression occurred, e.g., the digital component was presented, in an application and the specific event occurred in a browser.

The aggregation servers 180 can report impression data (e.g., impression counts), conversion data (e.g., conversion counts), to the reporting system 190. The reporting system 190 can be implemented as a reporting domain that implements a reporting URL which receives incoming requests that carry impression data, conversion data, and/or relevant network measurements. The reporting system 190 can be maintained by a digital component distributor or another entity that reports the data to the digital component distribution system 150 or the digital component distributor.

The environment 100 can also include a time server 192. The time server 192 can be used in some of the techniques described below. As described below, the time server 192 can be used to decrypt some data that is encrypted using a public key of the time server 192. The time server 192 can confidentially maintain a private key that corresponds to the public key and use the private key to decrypt the data.

Example Process Flow for Determining Network Measurements

Figure 2:
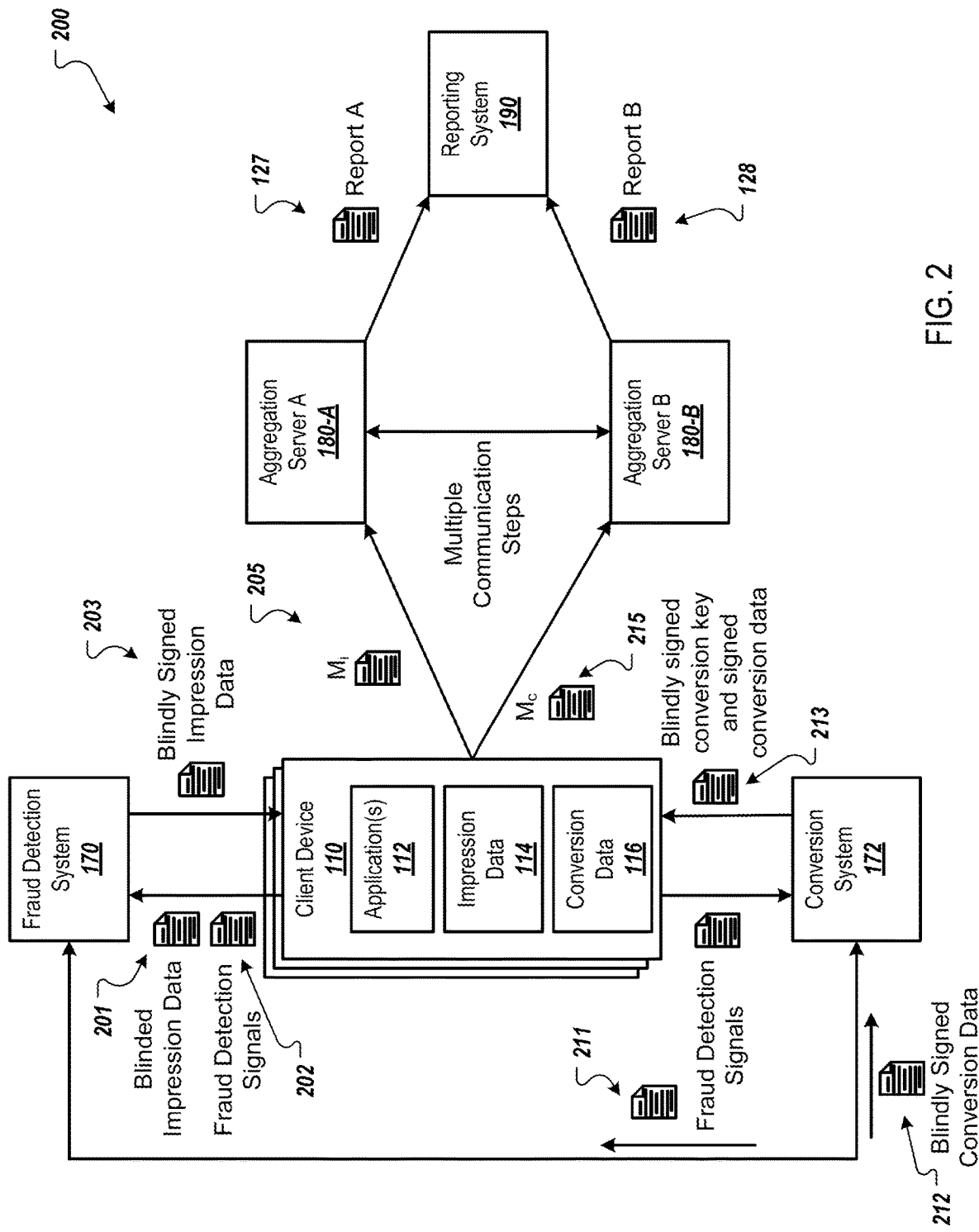
FIG. 2 is a block diagram that illustrates an example process flow for determining aggregated network measurements.

FIG. 2 is a block diagram of an example process flow 200 for determining aggregated network measurements. The process flow 200 is shown as being performed by some of the components of FIG. 1, including one or more client devices 110, the fraud detection system 170, the conversion detection system 172, the aggregation servers 180-A and 180-B, and the reporting system 190.

Each instance of an application 112, which can be a web browser or native application, can have a unique identifier that is used for conversion measurement purposes. In other words, an instance of a particular web browser on one client device would be different from, and have a different unique identifier than, another instance of the particular web browser executing on a different client device. The unique identifier for an application 112 can be randomly or pseudorandomly generated and the application 112 can be configured to never leak the unique identifier outside of the application 112. As described below, the characteristics and use of the unique identifier can vary based on the type of conversions being measured. In some implementations that support cross device measurement, all application(s) 112 on all client devices 110 owned by the same user may have the same unique identifier that is used for conversion measurement purposes.

When a digital component is presented by an application 112 at the client device 110, the application 112 can record impression data ($m_i$), a destination (dc_destination), a conversion measurement expiration date, and a reporting domain (report_domain) that will receive conversion reports for the digital component. The impression data can be in the form of an opaque byte array and can include, for example, one or more identifiers for the digital component and/or event-level data associated with the impression of the digital component at the application 112.

The destination can include a Uniform Resource Identifier (URI), URL or domain of a landing page for the digital component (e.g., a page linked to by the digital component and when the user clicks or interacts with the digital component, the application/browser presents the page to the user). Examples of URIs include links to an application store for downloading an application and deep links to locations within applications for in-app purchases. Thus, the destination can also be referred to as a destination domain. The conversion measurement expiration date can be a time (or time period) when the impression data is to be deleted from the client device 110. The reporting domain can be a reporting URL or domain to which conversion reports for the digital component are to be sent, e.g., for a reporting system 190 to which the digital component provider 160 wants conversion reports to be sent.

In some implementations, the application 112 can also record click data (clicked) that specifies whether the user interacted with, e.g., selected or clicked, the digital component when the application 112 presented the digital component. The click data can be a Boolean variable, e.g., with a value of one if interacted with and a value of zero if not interacted with. In some other implementations, the application(s) 112 can also record other types of metadata indicating how the user interacted with the digital components, e.g., the user filled in a survey or muted the digital components. For example, a user can mute a digital component to indicate that the user does not want to see the same (or similar) digital components in the future.

As described above, the application 112 can also interact with the fraud detection system 170 to determine whether the impression of the digital component is valid or fraudulent. The application 112 can also request that the fraud detection system 170 blindly sign information related to the impression if the impression is valid.

In some implementations, digital components can invoke computer-readable code, e.g., scripts, that collects fraud detection signals 202 and sends the fraud detection signals 202 to the fraud detection system 170 for evaluation. The application 112 can piggyback off of, e.g., add data to, this call to the fraud detection system 170 with a request for the fraud detection system 170 to blindly sign the information related to the impression if the impression is valid.

In some implementations, the application 112 can send, to the fraud detection system 170, blinded impression data 201. The blinded impression data 201 can include two blinded impression data elements to be blindly signed by the fraud detection system 170. Binding and/or encrypting these data elements protects user privacy by preventing the fraud detection system 170 from receiving unencrypted user data and from tracking the user.

A first encrypted data element is an encrypted crypto-hashed version of a combination (e.g., a concatenation or some other combination) of the unique identifier (ID) for the application, the destination (dc_destination), and the reporting domain (report_domain). This first encrypted data element can be defined as CryptoHash(ID, dc_destination, report_domain). The cryptographic hash in this example can be a one-way crypto hash function to map the tuple (ID, dc_destination, report_domain) to a hash value.

In one example, the crypto hash function is a hash-based message authentication code (HMAC), e.g., a $HMAC_{SHA256}$ message code. For example, the first encrypted data element can be: $HMAC_{SHA256}$ ($HMAC_{SHA256}$(ID, dc_destination), report_domain) using ID as the key and nesting HMAC. In another example, the first encrypted data element can be: SHA256 (ID||dc_destination||report_domain). For the purposes of this document, the symbol || denotes a method to compose complex messages from simple messages, where the composition is reversible, i.e., it is possible to extract back the simple messages from the complex message. One example method is a protocol buffer with serialization/deserialization. Other examples include Java™ serialization, JavaScript Object Notation (JSON), etc.

The second encrypted data element is an encrypted version of a combination of the impression data ($m_i$) and data specifying whether the digital component was clicked (clicked) or otherwise interacted with. For example, the application 112 can generate a complex message of ($m_i$||clicked) and encrypt this complex message using a public key obtained from, e.g., fetched from, the reporting system 190. This complex message represents the impression data and whether the digital component was clicked or otherwise interacted with. The application 112 can encrypt the complex message using a public key of the reporting system 190 so that only the reporting system 190 can decrypt the impression data and clicked data using a private key that corresponds to, e.g., is mathematically linked to, the public key. The reporting system 190 can maintain the private key confidentially so that other entities cannot access this information. This second encrypted data element can be defined as: PubKeyEncrypt($m_i$||clicked, report_domain) In this representation, the inclusion of "report_domain" after the comma indicates that the public key used to encrypt the complex message is the public key of the reporting system 190.

The fraud detection system 170 can receive the blinded impression data 201 and the fraud detection signals 202 and evaluate the fraud detection signals to determine whether the impression of the digital component is valid or fraudulent. If the fraud detection system 170 determines that the impression is valid, the fraud detection system 170 can blindly sign the blinded impression data 201 using a blind signing technique. For example, the fraud detection system 170 can generate a first blind signature for the first data element and a second blind signature for the second encrypted data element of the blinded impression data 201. In some implementations, the blind signing technique can be the Privacy Pass protocol supported by Cloudflare™, or trust token from Chrome, both of which is based on the Internet Engineering Task Force (IETF) Verifiable, Oblivious Pseudorandom Function (VOPRF) draft standard.

This VOPRF blind signing protocol is particularly advantageous as the amount of information exposed to the fraud detection system 170 should be limited and the application 112 needs to ensure that the signature is valid and does not contain any more information than just the signature, where extra information may be used to track the user. For the purpose of the techniques described in this document, the VOPRF protocol is considered to be deterministic since it applies a function and does not add to the argument of the function. The applications 112 can know the signature scheme to allow for signature verification and unblinding the impression data The fraud detection system 170 can send the blindly signed impression data 203 to the application 112. This blindly signed impression data 203 includes the first and second encrypted data elements and their respective blind signatures.

The application 112 can generate a key using the first encrypted data element and the blind signature for the first encrypted data element. This key can be referred to as a blindly signed join key and can be defined as BlindlySigned-Key(ID, dc_destination, report_domain), which, in turn, represents CryptoHash(ID, dc_destination, report_domain) combined with the blind signature of the first encrypted data element received from the fraud detection system 170.

The application 112 can also generate multi-encrypted impression data using the second encrypted data element and its blind signature received from the fraud detection system 170. For example, the application 112 can generate twice-encrypted impression data (ImpressionData$_2$) by encrypting a complex message that includes the second encrypted data element (PubKeyEncrypt(m$_i$‖clicked, report_domain) and the blind signature of the second encrypted data element. Let ImpressionData$_1$ represent the once-encrypted data (the second encrypted data element). This twice-encrypted impression data can be defined as ImpressionData$_2$=(PubKeyEncrypt(ImpressionData$_1$‖blind signature, S$_i$) where blind_signature represents the blind signature of the second encrypted data element and S$_i$ represents the public key of the aggregation server 180-A, which collects the impression data. That is, the application 112 can generate the twice-encrypted impression data (ImpressionData$_2$) by generating a complex message from the once-encrypted data (ImpressionData$_1$) and the blind signature of the once-encrypted impression data (ImpressionData$_1$) and encrypt this complex message using a public key of the aggregation server 180-A.

The application 112 can then generate thrice-encrypted impression data (ImpressionData$_3$) using the twice-encrypted impression data (ImpressionData$_2$) and a public key of the aggregation server 180-B, which collects conversion data. In some implementations, the thrice-encrypted impression data (ImpressionData$_3$) is generated using probabilistic public key encryption. In this example, the thrice-encrypted impression data can be defined as:

$$\text{ImpressionData}_{3p}=(\text{PubKeyEncrypt}_{Probabilistic})(\text{ImpressionData}_2, S_c).$$

At this point, the impression data is thrice-encrypted using the public key from the reporting system 190, the aggregation server 180-A, and the aggregation server 180-B, sequentially. In this way, the application 112 can safely send the thrice-encrypted impression data (ImpressionData$_{3p}$) to the aggregation server 180-A with sufficient privacy protection because the innermost once-encrypted impression data (PubKeyEncrypt(m$_i$‖clicked, report_domain) protects the impression data m$_i$ during transmission from the application 112 to the reporting system 190. The outermost probabilistic public key encryption using the public key of the aggregation server 180-B prevents collusion among the reporting system 190, the aggregation server 180-A, and the digital component distribution system 150, where the colluding parties may use stable blindly signed impression join key (BlindlySignedKey(ID, dc_destination, report_domain)) and reconstructable once-encrypted impression data (PubKeyEncrypt(m$_i$‖clicked, report_domain) to track users across publisher domains. As described below, only when the two aggregation servers 180-A and 180-B are confident that (PubKeyEncrypt(m$_i$‖clicked, report_domain) satisfies all applicable thresholds, the aggregation servers 180-A and 180-B collaboratively decrypt thrice-encrypted impression data to uncover (PubKeyEncrypt(m$_i$‖clicked, report_domain) that will be sent to the reporting system 190 by each aggregation server 180-A and 180-B independently.

In some implementations, the fraud detection system 170 uses two different keys to blindly sign the first encrypted data element to generate the blindly signed impression join key (BlindlySignedKey(ID, dc_destination, report_domain)) and to blindly sign the second encrypted data element (ImpressionData$_1$). This can prevent a malicious application, e.g., a malicious browser from requesting a blind signature for impression data and later claiming it as a signature for the blindly signed impression join key, or vice versa.

The application 112 can upload the impression data, e.g., the thrice-encrypted impression data, to the aggregation server 180-A for each impression for which impression data has been recorded. For example, the application 112 can periodically batch upload the multi-encrypted impression data (e.g., thrice-encrypted impression data). In some implementations, the application 112 uploads, for each impression, a key value pair M$_i$ 205 that includes, as the key, the blindly signed impression join key (BlindlySignedKey(ID, dc_destination, report_domain)) for the impression and, as the value, the thrice-encrypted impression data (ImpressionData$_{3p}$).

This batch upload has a few advantages over uploading the key value pair M$_i$ for each impression when the impression occurs. For example, the batch uploads can hide the actual impression time from the aggregation server 180-A to avoid timing based attacked. This can also reduce the load, e.g., the queries-per-second (QPS) load on the aggregation server 180-A. This can also reduce bandwidth and battery consumption by the client device 110, e.g., if the batch upload occurs when a mobile device is connected to Wi-Fi and charging. This also allows for the selection of a key per batch protocol instance for managing cryptographic keys, e.g., the same encryption key can be used for the entire batch if the communication between the client device 110 and the aggregation server 180-A is over Hypertext Transfer Protocol Secure (HTTPS).

When the conversion system 172 determines that a real conversion has occurred for the client device 110, the conversion system 172 can interact with the fraud detection system 170 to determine whether the conversion is valid or fraudulent. For example, the conversion system 172 can obtain fraud detection signals 211 from the client device 110 and send the fraud detection signals 211 to the fraud detection system 170. The fraud detection system 170 can evaluate the fraud detection signals 211 to determine whether the conversion is valid or fraudulent, whether the client device 110 is trustworthy (versus rooted, emulators in data centers, or otherwise compromised), and/or whether the user's interaction is genuine.

With the fraud detection signals, the conversion system 172 can also send a third encrypted data element to be blindly signed by the fraud detection system 170 if the conversion is valid. This third encrypted data element can include an encrypted version of a combination of the unique identifier (ID) for the application 112 and the conversion domain (conversion_domain) at which the conversion occurred. The conversion domain can be a website at which the conversion occurred. This data can be encrypted using a public key of the reporting system 190 for the conversion, similar to the way in which the first encrypted data element of the impression data is encrypted. For example, the third encrypted data element can be defined as CryptoHash(ID, conversion_domain, report_domain) and can be encrypted using the same crypto hash function as used to generate the first encrypted data element.

The fraud detection system 170 can blindly sign the third encrypted data element using the same protocol used to sign the first encrypted data element for impressions. The fraud detection system 170 can then send blindly signed conversion data 212 to the conversion system 172. This blindly signed conversion data 212 can include the blindly signed third encrypted data element and the blind signature of the third encrypted data element. The conversion system 172 can generate a blindly signed conversion key using the blindly signed conversion data 212. The blindly signed conversion key (BlindlySignedKey(ID, conversion_domain, report_domain)) that is a combination of the third encrypted data element and the blind signature of the third encrypted data element received from the fraud detection system 170. In this way, if the conversion is indeed triggered by an impression, the dc_destination at impression time and the conversion_domain at conversion time will be the same. Therefore, the blindly signed impression key will match the blindly signed conversion key.

The conversion system 172 can also generate signed conversion data using conversion metadata $m_c$ for the conversion and a private key of the conversion system 172. The conversion metadata $m_c$ can include data related to the conversion, such as the conversion type, label and quantized conversion values, etc. The signed conversion data can be defined as PrivateKeySign($m_c$, conversion_domain). Generating the signed conversion data can include appending a digital signature to the conversion metadata using the private key and a public key based digital signature algorithm. The conversion system 172 can provide the blindly signed conversion key and the signed conversion data 213 to the application 112.

The application 112 can generate multi-encrypted conversion data using the signed conversion data (PrivateKeySign($m_c$, conversion_domain)). The application 112 can generate once-encrypted conversion data by encrypting the signed conversion data (PrivateKeySign($m_c$, conversion_domain)) using a public key of the reporting system 190 for the conversion. This once-encrypted conversion data (ConversionData$_1$) can be defined as PubKeyEncrypt(PrivateKeySign($m_c$, conversion_domain), report_domain). In some implementation, the conversion system 172 can generate the multi-encrypted conversion data, or at least the once-encrypted conversion data, rather than the application 112.

The use of the encryption in combination with the digital signature protects the conversion data $m_c$ from falsification and eavesdropping during transmission from the conversion system 172 to the reporting system 190 through multiple intermediaries, e.g., the aggregation servers 180-A and 180-B. To facilitate aggregation and enforce k-anonymity in later stages, the encryption and digital signature in ConversionData$_1$ should be deterministic within the window of time/batch processing time so identical plaintext is mapped to identical ciphertexts.

In some cases, the conversion metadata $m_c$ may not have much entropy. Therefore, the once-encrypted conversion data (ConversionData$_1$) may have limited cardinality and can be easily guessed. In such cases, pseudo-entropy (e.g., cryptographic-key based randomness) can be added to the conversion metadata $m_c$ by composing a complex message from the conversion metadata $m_c$ and the cryptohash of conversion domain (conversion_domain) and the reporting domain (report_domain) and encrypting the complex message. In this example, the once-encrypted conversion data (ConversionData$_1$) can be defined as: PubKeyEncrypt(PrivateKeySign($m_c$||HMAC$_{SHA256}$(conversion_domain, report_domain), conversion_domain), report_domain) in which HMAC$_{SHA256}$(conversion_domain, report_domain) is a crypto hash of the conversion domain and the reporting domain and adds the pseudo-entropy. In this example, a private key of the conversion domain is used to sign the complex message and a public key of the reporting domain is used to encrypt the signed complex message.

The application 112 can generate twice-encrypted conversion data (ConversionData$_2$) by encrypting the once-encrypted conversion data (ConversionData$_1$) using a public key of the aggregation server 180-B which collects conversion data. The twice-encrypted conversion data (ConversionData$_2$) can be defined as PubKeyEncrypt(ConversionData$_1$, $S_c$) where $S_c$ represents the public key of the aggregation server 180-B. The application 112 can then generate thrice-encrypted conversion data (ConversionData$_3$) by encrypting the twice-encrypted conversion data (ConversionData$_2$) using a public key of the aggregation server 180-A which collects impression data. In some implementations, the thrice-encrypted conversion data (ConversionData$_3$) is generated using probabilistic public key encryption. In this example, the thrice-encrypted conversion data can be defined as: PubKeyEncrypt$_{Probabilistic}$(ConversionData$_2$, $S_i$) where $S_i$ represents the public key of the aggregation server 180-A.

The application 112 can upload the conversion data to the aggregation server 180-B for each conversion for which conversion data has been recorded. For example, the application 112 can periodically batch upload the multi-encrypted conversion data (e.g., thrice-encrypted conversion data). In some implementations, the application 112 uploads, for each conversion, a key value pair $M_c$ 215 that includes, as the key, the blindly signed conversion key (BlindlySignedKey(ID, conversion_domain, report_domain)) for the conversion and, as the value, the thrice-encrypted conversion data (ConversionData$_3$ or ConversionData$_{3p}$). This third, outermost, encryption can prevent the aggregation server 180-B from tracking users across multiple domains reporting conversions using stable blindly signed conversion keys and twice-encrypted conversion data (ConversionData$_2$).

Example MPC Processes for Decrypting Impression and Conversion Data

Figure 3:
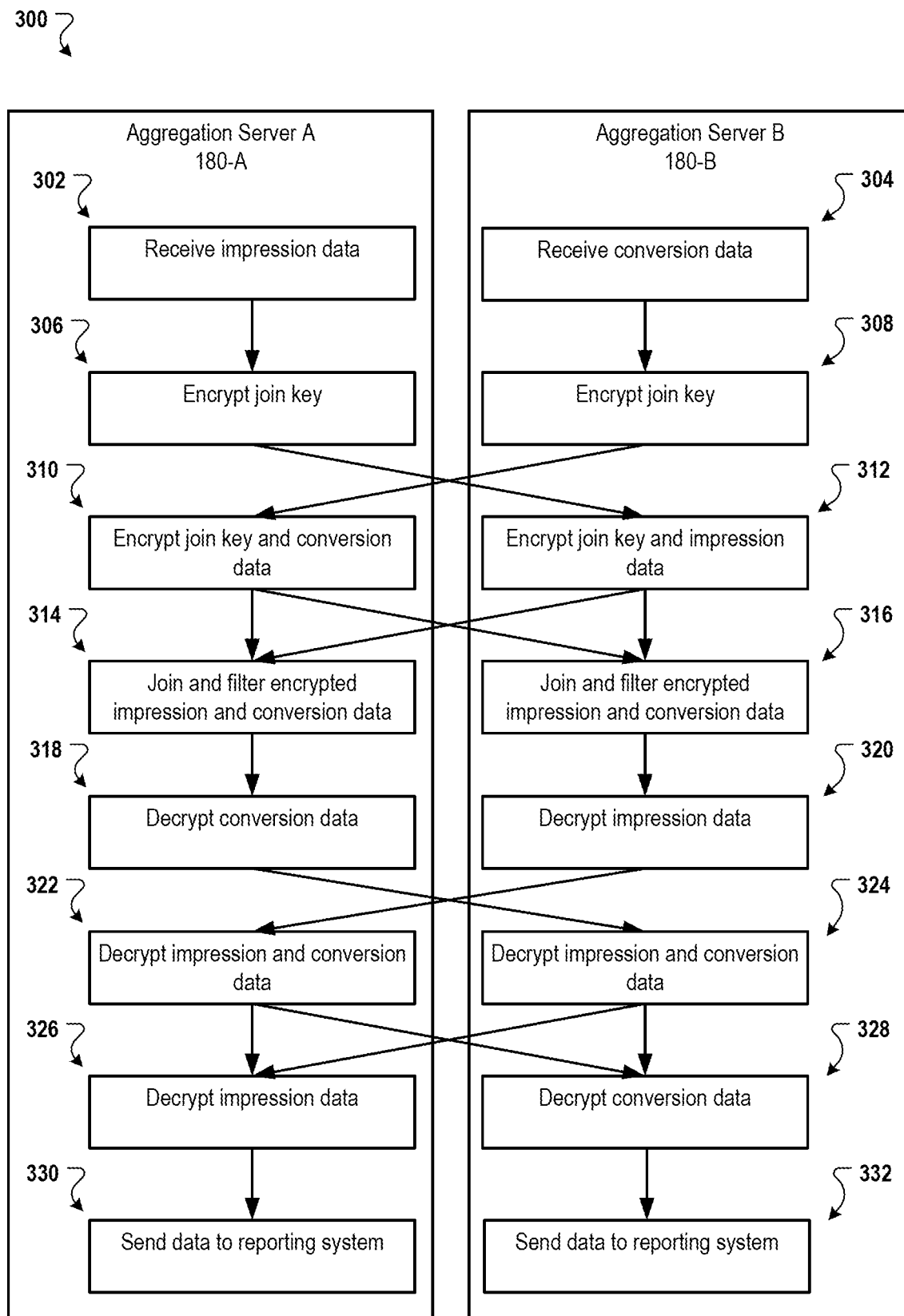
FIG. 3 is a flow diagram that illustrates an example process for determining aggregated data.

The aggregation servers 180-A and 180-B can use a multi-step MPC process to aggregate then decrypt a subset of data received that satisfy thresholding and/or other privacy protection criteria, and send reports to the reporting system 190. This process is illustrated in FIG. 3, which is a flow diagram that illustrates an example process 300 for determining aggregated conversion data. The process 300 can be implemented, for example, by multiple aggregation servers, e.g., the aggregation servers 180-A and 180-B of FIGS. 1 and 2.

The aggregation servers A and B can use a commutative encryption technique "H" with commutative property. In other words, given an arbitrary message m and two distinct encryption keys $K_1$ and $K_2$, the commutative encryption technique has the following property: $H(H(m, K_1)=H(H(m, K_2), K_1)$. In other words, commutative encryption involves a double encryption using distinct encryption keys, wherein the order of encryption (which key is used to encrypt data first) does not matter, as the same result is achieved either way.

Each aggregation server 180-A and 180-B can select a pair of secret encryption keys Key$_i$ (which represents a pair of keys) and Key$_c$ (which represents a pair of keys), respectively. As described below, one of the keys Key$_{i1}$ can be used to encrypt a join key and one of the keys Key$_{c2}$ can be used to encrypt/decrypt impression data. Similarly, one of the keys Key$_{c1}$ can be used to encrypt a join key and one of the keys Key$_{c2}$ can be used to encrypt/decrypt conversion data. The aggregation servers 180-A and 180-B can select a new pair of keys periodically based on a specified time period, per batch of impression or conversion data, or based on other appropriate criteria.

The aggregation server 180-A receives impression data (302). For example, the aggregation server 180-A can receive a batch of impression data from multiple client devices. As described above, each client device can periodically send batches of impression data to the aggregation server 180-A.

The impression data can be sent in the form of a key value pair for each impression. Each key value pair can include, as the key, the blindly signed impression key (BlindlySignedKey(ID, dc_destination, report_domain)) for the impression and, as the value, the thrice-encrypted impression data (ImpressionData$_{3p}$).

The aggregation server 180-B receives conversion data (304). For example, the aggregation server 180-B can receive a batch of conversion data from multiple client devices. As described above, each client device can periodically send batches of conversion data to the aggregation server 180-B.

The conversion data can be sent in the form of a key value pair for each conversion. Each key value pair can include, as the key, the blindly signed conversion key (BlindlySignedKey(ID, conversion_domain, report_domain)) for the conversion and, as the value, the thrice-encrypted conversion data (ConversionData$_{3p}$).

For each impression, the aggregation server 180-A encrypts a join key using commutative encryption and its selected encryption key Key$_{i1}$ (306). In this example, the join key for an impression is the blindly signed join impression key (BlindlySignedKey(ID, dc_destination, report_domain)) for the impression. The aggregation server 180-A can then provide, for each impression, the encrypted join key and the thrice-encrypted impression data to the aggregation server 180-B. In other words, the aggregation server 180-A can send, for each impression, a pair: {H(BlindlySignedKey, Key$_{i1}$), ImpressionData$_{3p}$}. The pairs can be sent in a random or pseudo random order.

For each conversion, the aggregation server 180-B encrypts a join key using commutative encryption and its selected encryption key Key$_{c1}$ (308). In this example, the join key for a conversion is the blindly signed conversion key (BlindlySignedKey(ID, conversion_domain, report_domain)) for the conversion. The aggregation server 180-B can then provide, for each conversion, the encrypted join key and the thrice-encrypted conversion data to the aggregation server 180-A. In other words, the aggregation server 180-B can send, for each impression, a pair: {H(BlindlySignedKey, Key$_c$), ConversionData$_{3p}$}. The pairs can be sent in a random or pseudorandom order.

For each received pair of encrypted join key and thrice-encrypted conversion data {H(BlindlySignedKey, Key$_{c1}$), ConversionData$_{3p}$}, the aggregation server 180-A re-encrypts the join key and the conversion data (310). In some implementations, the aggregation server 180-A can decrypt the thrice-encrypted conversion data (ConversionData$_{3p}$) using its private key (the private key corresponding to public key S$_i$) to recover the twice-encrypted conversion data (ConversionData$_2$). The aggregation server 180-A can then re-encrypt the twice-encrypted conversion data (ConversionData$_2$) using its selected encryption key Key$_{i2}$. For this encryption, a deterministic symmetric encryption technique can be used. This encrypted conversion data can be referred to as ConversionData$_{3'}$ as the conversion data has been deterministically encrypted thrice using keys from three domains, the reporting system 190, the aggregation server 180-B, and the aggregation server 180-A, sequentially.

The aggregation server 180-A can also apply commutative encryption on top of the already commutatively encrypted blindly signed impression key (H(BlindlySignedKey, Key$_{c1}$) using its selected encryption key Key$_{i2}$. The results of this step are H(BlindlySignedKey) and ConversionData$_{3'}$. The aggregation server 180-A sends, for each received pair of encrypted join key and encrypted thrice-encrypted conversion data, the two results to the aggregation server 180-B.

For each received pair of encrypted join key and encrypted thrice-encrypted impression data {H(BlindlySignedKey, ImpressionData$_{3p}$}, the aggregation server 180-B re-encrypts the join key and the impression data (312). In some implementations, the aggregation server 180-B can decrypt the thrice-encrypted impression data (ImpressionData$_{3p}$) using its private key (the private key corresponding to public key S$_c$) to recover the twice-encrypted impression data (ImpressionData$_2$). The aggregation server 180-B can then re-encrypt the twice-encrypted impression data (ImpressionData$_2$) using its selected encryption key Key$_{c2}$. For this encryption, a deterministic symmetric encryption technique can be used. This encrypted conversion data can be referred to as ImpressionData$_{3'}$ as the impression data has been deterministically encrypted thrice using keys from three domains, the reporting system 190, the aggregation server 180-A, and the aggregation server 180-B, sequentially.

The aggregation server 180-B can also apply commutative encryption on top of the already commutatively encrypted blindly signed impression key (H(BlindlySignedKey, Key$_{i1}$) using its selected encryption key Key$_{c2}$. The results of this step are H(BlindlySignedKey) and ImpressionData$_{3'}$. The aggregation server 180-B sends, for each received pair of encrypted join key and thrice-encrypted impression data, the two results to the aggregation server 180-A.

The aggregation server 180-A joins and filters the encrypted impression and conversion data (314). After receiving the results from the aggregation server 180-B, the aggregation server 180-A has, for each impression, a pair of results { H(BlindlySignedKey) and ImpressionData$_{3'}$}. The aggregation server 180-A also has, for each conversion, a pair of results { H(BlindlySignedKey) and ConversionData$_{3'}$}.

As the blindly signed keys have been encrypted once by each aggregation server 180-A and 180-B using commutative encryption, an encrypted blindly signed key (H(BlindlySignedKey)) for an impression that matches the encrypted blindly signed key (H(BlindlySignedKey)) indicates that the conversion resulted from the impression of a digital component as these keys are based on the unique identifier for the application 112, the domain of the reporting system 190, and the domain of the landing page for the digital component. Thus, the aggregation server 180-A can join the pairs using the encrypted blindly signed key (H(BlindlySignedKey)). Joining corresponding impression data with corresponding conversion data can include linking the impression data to the conversion data. For example, the aggregation server 180-A can generate a table or other data structure that uses the encrypted blindly signed key (H(BlindlySignedKey)) as a row key. Each row can include a row key and the joined impression data and conversion data. An example table is shown below in Table 1. In other examples, joining impression data and conversion data can include generating, for each joined impression data and conversion data, a tuple that includes the row key and the joined impression data and conversion data.

TABLE 1

| Row Key | Thrice-encrypted Impression Data | Thrice-encrypted Conversion Data |
|---|---|---|
| H(BlindlySignedKey)) | ImpressionData$_{3'}$ | ConversionData$_{3'}$ |
| ... | ... | ... |

The aggregation server 180-A can then filter the data to satisfy k-anonymity criteria. The aggregation server 180-A can determine a number of unique encrypted blindly signed keys (H(BlindlySignedKey)) associated with each thrice-encrypted impression data. Each piece of thrice-encrypted impression data can also be referred to as an occurrence of impression data. As the impression data is not application-specific and is instead based on the digital component presented, multiple impressions can have the same thrice-encrypted impression data but different encrypted blindly signed keys (H(BlindlySignedKey)).

The aggregation server 180-A can compare the number of distinct encrypted blindly signed keys (H(BlindlySigned-Key)) associated with each unique impression data to a k-anonymity threshold. If the number is below the threshold, the aggregation server 180-A can filter the occurrence of the impression data from the table or other data structure.

The aggregation server 180-A can also determine a number of unique encrypted blindly signed keys (H(BlindlySignedKey)) associated with each thrice-encrypted conversion data. Each piece of thrice-encrypted conversion data can also be referred to as an occurrence of conversion data. As the conversion data is not application-specific and is instead based on data related to the conversion event, multiple conversions can have the same thrice-encrypted conversion data but different encrypted blindly signed keys (H(BlindlySignedKey)).

The aggregation server 180-A can compare the number of distinct encrypted blindly signed keys (H(BlindlySigned-Key)) associated with each unique conversion data to a k-anonymity threshold. If the number is below the threshold, the aggregation server 180-A can filter the occurrence of the conversion data from the table or other data structure.

The aggregation server 180-A can also determine a number of unique encrypted blindly signed keys (H(BlindlySignedKey)) associated with each combination of thrice-encrypted impression data and conversion data. In other words, this is the count of the number unique blindly signed keys having the same thrice-encrypted impression data and the same thrice-encrypted conversion data. Each combination of thrice-encrypted impression data and the same thrice-encrypted conversion data can also be referred to as an occurrence of impression cross conversion data.

The aggregation server 180-A can compare the number for each occurrence of impression cross conversion data to a k-anonymity threshold. If the number is below the threshold, the aggregation server 180-A can filter the occurrence of the impression cross conversion data from the table or other data structure.

The aggregation server 180-A can then use the remaining data after the filtering to generate a new table or data structure, as shown in Table 2 below. Each row of Table 2 corresponds to a combination of an occurrence of impressionData3' and a corresponding occurrence of Conversion-Data3'. This table records the number of occurrences of each combination, e.g., the number of unique encrypted blindly signed keys (H(BlindlySignedKey)) associated with each combination. This count is equal to the number of conversions of a digital component resulting from impressions of the digital component having the same impression data.

TABLE 2

| Occurrence of Impression Cross Conversion Data | Thrice-encrypted Impression Data | Thrice-encrypted Conversion Data |
|---|---|---|
| ... | ImpressionData$_{3'}$ | ConversionData$_{3'}$ |
| | ... | ... |

The aggregation server 180-B joins and filters the encrypted impression and conversion data (316). After receiving the results from the aggregation server 180-A, the aggregation server 180-B has, for each impression, a pair of results {H(BlindlySignedKey) and ImpressionData$_{3'}$}. The aggregation server 180-A also has, for each conversion, a pair of results {H(BlindlySignedKey) and Conversion-Data$_{3'}$}. Thus, the aggregation server 180-B has the same data as the aggregation server 180-A.

The aggregation server 180-B can perform the same computations and filtering as the aggregation server 180-A using the same data, to reach the same results. That is, the aggregation server 180-B can generate a table that matches Table 2 generated by the aggregation server 180-A.

In some implementations, both aggregation servers 180-A and 180-B can perform some optional operations to ensure differential privacy, such as using subsampling. Differential privacy is a technique for sharing data about a dataset by describing the patterns of groups within the dataset without providing individual data in the dataset. To do this, each aggregation server can first sample the data (e.g., rows in Table 1) with some probability beta. Then, the aggregation server applies the k-anonymity generalization described above to the sampled data only. That is, the aggregation server can determine the number of unique encrypted blindly signed keys (H(BlindlySignedKey)) for each type of occurrence and filter from the sampled data the ones that do not meet the k-anonymity thresholds.

For subsampling, to ensure that both aggregation servers replicate exactly the same sampling and perform the same differential privacy technique, the aggregation servers can use pseudorandomness-based sampling. The randomization for the sampling can be determined from a common seed that is collaboratively determined by the two servers (e.g., using a Diffie-Hellman key exchange). The result of the exchange is a seed for the same pseudorandom generator (e.g., one based on the Advanced Encryption Standard (AES) algorithm). This ensures that the same subset is sampled in both aggregation servers and the same results will be computed since once pseudorandomness is the same, the rest of the process is deterministic.

After the joining and filtering, both aggregation servers 180-A and 180-B have the same data, e.g., a table or list of tuples that each include {count, ImpressionData$_{3'}$, ConversionData$_{3'}$}. The count is the number of conversions for impressions having the same impression data represented by ImpressionData$_{3}$.

For each tuple, the aggregation server 180-A decrypts the thrice-encrypted conversion data (ConversionData$_{3'}$) (318). The aggregation server 180-A can decrypt the thrice-encrypted conversion data (ConversionData$_{3'}$) using its selected encryption key Key$_{t2}$ to obtain {count, ImpressionData$_{3'}$, ConversionData$_{2'}$}. The aggregation server 180-A can send these resulting tuples to the aggregation server 180-B.

Similarly, for each tuple, the aggregation server 180-B decrypts the thrice-encrypted impression data (ImpressionData$_{3'}$) (320). The aggregation server 180-B can decrypt the thrice-encrypted impression data (ImpressionData$_{3'}$) using its selected encryption key key$_{c2}$ to obtain {count, ImpressionData$_2$, ConversiodData$_{3'}$}. The aggregation server 180-B can send these resulting tuples to the aggregation server 180-A.

The aggregation server 180-A decrypts the twice-encrypted impression data (ImpressionData$_2$) and the thrice-encrypted conversion data (ConversionData$_{3'}$) of each received resulting tuple {count, ImpressionData$_2$, ConversionData$_{3'}$} (322). The aggregation server 180-A can decrypt the twice-encrypted impression data (ImpressionData$_2$) and the thrice-encrypted conversion data (ConversionData$_{3'}$) using the private key corresponding to the public key S$_i$ of the aggregation server 180-A. This decryption, for each received tuple, results in a tuple {count, ImpressionData$_1$, ConversionData$_2$}. The aggregation server 180-A can send each of these tuples {count, ImpressionData$_1$, ConversionData$_2$} to the aggregation server 180-B.

The aggregation server 180-B decrypts the thrice-encrypted impression data (ImpressionData$_3$) and the twice-encrypted conversion data (ConversionData$_2$) of each received resulting tuple {count, ImpressionData$_3'$, ConversionData$_2$} (324). The aggregation server 180-B can decrypt the thrice-encrypted impression data (ImpressionData$_3$) and the twice-encrypted conversion data (ConversionData$_2$) using the private key corresponding to the public key S$_c$ of the aggregation server 180-B. This decryption, for each received tuple, results in a tuple {count, ImpressionData$_2$, ConversionData$_1$}. The aggregation server 180-B can send each of these tuples {count, ImpressionData$_2$, ConversionData$_1$} to the aggregation server 180-A.

The aggregation server 180-A decrypts the impression data of each received tuple {count, ImpressionData$_2$, ConversionData$_1$} (326). The aggregation server 180-A decrypts the impression data of each received tuple {count, ImpressionData$_2$, ConversionData$_1$} using the private key corresponding to the public key S$_i$ of the aggregation server 180-A. This decryption, for each received tuple, results in a tuple {count, ImpressionData$_1$, ConversionData$_1$}.

In this tuple, the impression data (ImpressionData$_1$) is PubKeyEncrypt(m$_i$||clicked, report_domain) II blind signature) and thus, includes the impression data encrypted using the public key of the reporting system 190 and the blind signature of the second data element generated at impression time. The conversion data (ConversionData$_1$) is PubKeyEncrypt(PrivateKeySign(m$_c$, conversion_domain), report_domain) and thus includes the conversion data encrypted using the public key of the reporting system 190.

The aggregation server 180-B decrypts the conversion data of each received tuple {count, ImpressionData$_1$, ConversionData$_2$} (328). The aggregation server 180-B decrypts the conversion data of each received tuple {count, ImpressionData$_1$, ConversionData$_2$} using the private key corresponding to the public key S$_c$ of the aggregation server 180-B. This decryption, for each received tuple, results in a tuple {count, ImpressionData$_1$, ConversionData$_1$}.

Like the tuples decrypted by the aggregation server 180-A, in this tuple, the impression data (ImpressionData$_1$) is PubKeyEncrypt(m$_i$||clicked, report_domain)||blind signature) and thus, includes the impression data encrypted using the public key of the reporting system 190 and the blind signature of the second data element generated at impression time. The conversion data (ConversionData$_1$) is PubKeyEncrypt(PrivateKeySign(m$_c$, conversion_domain), report_domain) and thus includes the conversion data encrypted using the public key of the reporting system 190.

The aggregation server 180-A sends, for each decrypted tuple, a conversion report to the reporting system 190 for the tuple (330). Similarly, the aggregation server 180-B sends, for each decrypted tuple, a conversion report to the reporting system 190 for the tuple (332). The conversion reports can include the decrypted tuples or the data included in the decrypted tuples.

The aggregation servers 180-A and 180-B can obtain the URL for the reporting system for each tuple, and thus, each conversion, in various ways. In one example, the application 112 at which an impression occurs can send the report_domain (e.g., the URL for the reporting system 190) to the aggregation server 180-A in plaintext, e.g., at impression time and as part of the key value pair M. Similarly, the application 112 at which a conversion occurs can send the report_domain to the aggregation server 180-B in plaintext, e.g., at conversion time as part of the key value pair M$_c$.

In another example, browser developers (or application developers) can publish a whitelist of allowed reporting systems 190 and their report_domain. The browsers (or applications) can periodically download the whitelist and apply the whitelist for sending conversion reports.

In another example, the browsers or applications can use a (t, n)-threshold encryption technique to encrypt the report-domain and send the encrypted report_domain to the aggregation servers 180-A and 180-B. In this example, the aggregation servers 180-A and 180-B can only recover the plaintext report_domain when at least t browsers or applications have reported the same report_domain. In another example, a derivation of the report_domain can be used in the (t, n)-threshold encryption technique, e.g., if the report_domain does not have sufficient entropy. For example, the derivation can be a combination of the report_domain and a crypto hash of the landing page for the digital component.

Returning to FIG. 2, the reporting system 190 receives two conversion reports 127 and 128 from the aggregation servers 180-A and 180-B for each once-encrypted conversion data (ImpressionData$_1$) and PubKeyEncrypt(PrivateKeySign(m$_c$, conversion_domain), report_domain) pair. Each conversion report 127 and 128 can include, for each combination of impression and conversion, the number for the combination in the filtered data, e.g., as derived from Table described above. The data in the conversion report 127 received from the aggregation server 180-A should match the data in the conversion report 128 received from the aggregation server 180-B for the same batch of impression and conversion data. The reporting system 190 can compare the two numbers to identify discrepancy for potential signs of malicious behavior.

The reporting system 190 can also invoke the fraud detection system 170 to verify the blinded signature on the impression data. The reporting system 190 can then decrypt the encrypted conversion data using its own private key. The reporting system 190 can then verify the digital signature on the conversion data using the conversions system's public key. If both verifications are successful, the reporting system 190 can be confident that the conversion measurement data is valid.

The recipient of a conversion report should be able to trust the data in the conversion report. The above techniques of comparing the conversion reports received from the two aggregation servers 180-A and 180-B and verifying the blind signatures can prevent most fraud in the conversion reporting pipeline. However, the two aggregation servers could collude to modify the conversion counts. To prevent such collusion, the conversion server 172 can encrypt and digitally sign conversion data prior to providing the conversion data to the client device 110. For example, the conversion system 172 can encrypt and digitally sign the conversion data using asymmetric additive homomorphic encryption that preserves the signature or another structure-preserving signature technique. In this way, the digital signature is preserved after being thrice-encrypted (or otherwise multi-encrypted), as described above. This encryption prevents the aggregation servers 180-A and 180-B from accessing the conversion data and enables the recipient to verify the digital signature to verify that the conversion data has not been modified. When conversion values are included in the conversion data, as described below, each conversion value can be encrypted and signed in a similar manner.

The conversion reporting techniques described above can support various types of conversion events. To support same browser (or same application) click-through conversions and view-through conversions, the browser or application can select a browser-wide (or application-wide) randomly generated unique identifier (ID) dedicated for conversion measurement purposes. The browser (or application) can calculate BlindlySignedKey(ID, conversion_domain, report_domain) at both impression and conversion time. To differentiate click-through conversions from view-through conversions, at impression time, the browser or application can encode whether the user interacted with the digital component using a boolean variable clicked together with the impression data $m_i$. In other implementation, the browser or application can encode the type of user interaction with the digital component, e.g,. mute the digital component, fill in a survey, etc.

To support same-device conversion between applications and web browsers, both the browser and the application can report impressions and conversions using a device-level randomly generated (e.g., by the device's operating system) unique identifier (ID). In addition, if the conversion occurs in the application rather than a web browser, the conversion_domain could be the application's name or application developer's certificate that identifies the application.

To support cross-device conversions (e.g., the impression occurred on one device of the user and the conversion occurred on a different device of the user), the unique identifier (ID) can be information about the user or based on such information. For example, the unique identifier (ID) could be a crypto hash of the user's sign-in credentials, a phone number or e-mail address provided by the user, or other personal identifiable information provided by the user. For example, the user could sign into a mobile application. The same user could sign into a publisher's website using the mobile application's sign-in credential. The same sign-in credentials can be used as the user identifier (ID) for cross-device conversions that occur between website and the mobile application.

Figure 4:
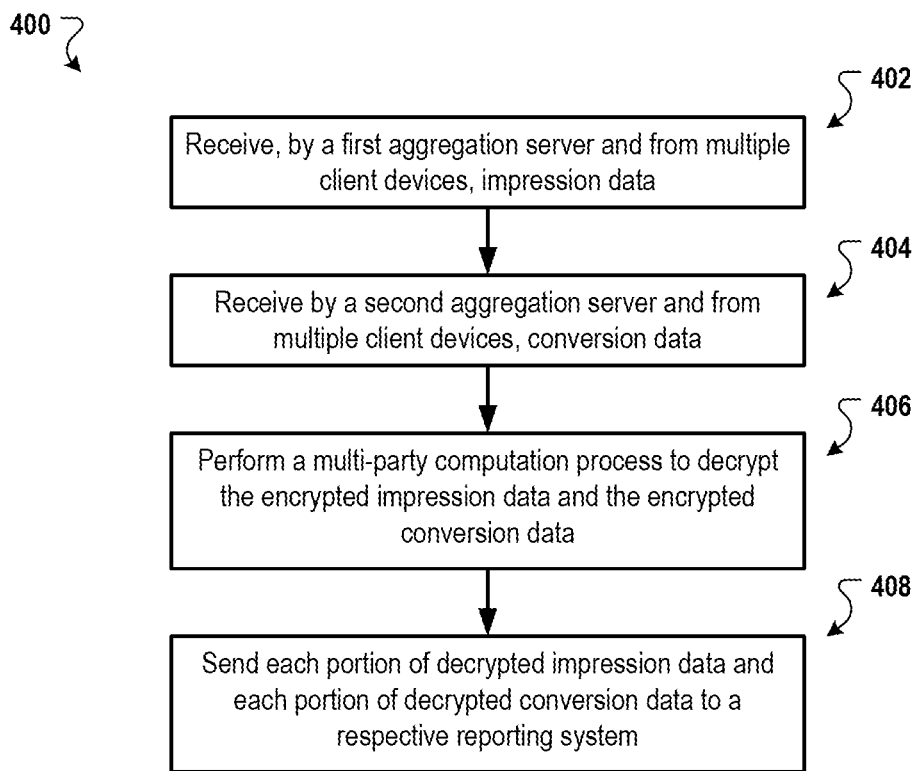
FIG. 4 is a flow diagram that illustrates another example process for determining aggregated data.

FIG. 4 is a flow diagram that illustrates another example process 400 for determining aggregated conversion data. The process 400 can be implemented, for example, by multiple aggregation servers, e.g., the aggregation servers 180-A and 180-B of FIGS. 1 and 2.

The first aggregation server 180-A receives, from multiple client devices, impression data (402). For each impression of a digital component recorded by the client device, the impression data can include a first key value pair. The first key value pair for an impression can include a first key that is based on a unique identifier for the client device or an application on the client device at which the impression occurred. For example, the first key for an impression can be the blindly signed impression key and can be defined as BlindlySignedKey(ID, dc_destination, report_domain) received from the client device, as described above.

The first key value pair for an impression can also include a first value that includes encrypted impression data that has been encrypted using a first public key of the first aggregation server and using a second public key of a second aggregation server different from the first aggregation server. For example, the first value can be the thrice-encrypted impression data (ImpressionData$_3$) received from the client device.

The second aggregation server receives, from at least a portion of the multiple client devices, conversion data (404). The conversion data can include, for each conversion recorded by the client device, a second key value pair that includes a second key that is based on a second unique identifier for the client device or an application on the client device at which the conversion occurred. For example, the second key for a conversion can be the blindly signed conversion key (BlindlySignedKey(ID, conversion_domain, report_domain)) received from the client device.

The second key value pair for a conversion can include a second value that includes encrypted conversion data that has been encrypted using the first encryption key and the second encryption key. For example, the second value can be the thrice-encrypted conversion data (ConversionData$_3$) received from the client device.

The aggregation servers 180-A and 180-B perform an MPC process to join encrypted impression and conversion data, filter the join result, then decrypt a subset of the encrypted impression data and the encrypted conversion data that satisfies privacy protection criteria (406). This MPC process can include identifying, based on the first keys and the second keys, pairs of encrypted conversion data and corresponding encrypted impression data. The impression data and the conversion data for each pair of encrypted impression data and conversion data can then be decrypted in multiple stages using a first private key that corresponds to the first public key and a second private key that corresponds to the second public key. Each stage can include one of the first aggregation server or the second aggregation server decrypting one of the encrypted impression data or the encrypted conversion data of each pair of encrypted conversion data and corresponding encrypted impression data and sending resulting data to the other of the first aggregation server or the second aggregation server. This MPC process can be the same as, or similar to the process 300 illustrated in FIG. 3 and described above.

Each portion of decrypted impression data and each portion of decrypted conversion data is sent to a respective reporting system (408). For example, each aggregation server 180-A and 180-B can send conversion reports to the respective reporting systems, as described above.

Verifying the Integrity of Each Aggregation Server's Data

As described above, at the beginning of the process 300, the aggregation server 180-A receives impression data ($M_i$)) in the form of a key value pair for each impression. Each key value pair can include the blindly signed impression key (BlindlySignedKey(ID, dc_destination, report_domain)) for the impression the thrice-encrypted impression data (ImpressionData$_{3p}$). The last encryption of the thrice-encrypted impression data (ImpressionData$_{3p}$) is probabilistic using the public key of the aggregation server 180-B. Therefore, no other party other than the aggregation server 180-B can decrypt the thrice-encrypted impression data (ImpressionData$_{3p}$), which can be a cryptographically random number to all servers except the aggregation server 180-B.

In addition, no other party except the application 112 knows the plaintext value of the user identifier (ID). The only information that colluding parties can recover is that an anonymous user behind the blindly signed impression key (BlindlySignedKey(ID, dc_destination, report_domain)) has a number of impressions with unknown characteristics. The colluding parties cannot infer the total number of impressions that the application 112/client device 110/user has seen because the entire digital component rendering is sharded by the destination (dc_destination) and the reporting domain (report_domain).

If knowing the number of impressions shown to the user associated with the blindly signed impression key (BlindlySignedKey(ID, dc_destination, report_domain)) is a concern, the application 112 can send out the impression data ($M_i$) for impression repetitively for a random or pseudo-random of times. Given the probabilistic encryption applied when generating the thrice-encrypted impression data (ImpressionData$_{3p}$), the aggregation server 180-A and any colluding parties cannot deduplicate the received impression data. However, the aggregation server 180-B can deduplicate the impressions after decrypting the thrice-encrypted impression data (ImpressionData$_{3p}$) to recover the twice-encrypted impression data (ImpressionData$_2$).

As described above with reference to the process 300, at the beginning of step 310 of the process 300, the aggregation server 180-A receives the pair {H(BlindlySignedKey, Key$_c$), ConversionData$_{3s}$} from the aggregation server 180-B, which cannot be joined to what the aggregation server 180-A has at step 302, i.e., the key value pairs {(BlindlySignedKey(ID, dc_destination, report_domain)), ImpressionData$_{3p}$}. In addition, the blindly signed key H(BlindlySignedKey, Key$_c$) may only be valid for each execution of the MPC process and the aggregation server 180-B can discard the selected keys Keys$_{c1}$ and Key$_{c2}$ after each execution. The aggregation server 180-A can decrypt the thrice-encrypted conversion data (ConversionData$_{3p}$) using its public key to recover the twice-encrypted conversion data (ConversionData$_2$). At this point, the aggregation server 180-A has H(BlindlySignedKey, Key$_c$) and the twice-encrypted conversion data (ConversionData$_2$), both of which are encrypted and only the aggregation server 180-B has the decryption key. With the aggregation server 180-B being honest, there is nothing the aggregation server 180-A can do to endanger user privacy.

At the beginning of step 314 of the process 300, the aggregation server 180-A receives, for each impression, the twice-encrypted blindly signed join key (H (BlindlySignedKey)) and the thrice-encrypted impression data (ImpressionData$_3$,) from the aggregation server 180-B. This thrice-encrypted impression data (ImpressionData$_3$,) was last encrypted using a key owned by the aggregation server 180-B, which is valid only for the current execution of the MPC process. Without collusion with the aggregation server 180-B, the worst the aggregation server 180-A can do is send a fake tuple of data {count', ImpressionData$_3$', ConversionData$_2$'} rather than the actual tuple of data {count, ImpressionData$_3$', ConversionData$_2$'}.

Figure 5:
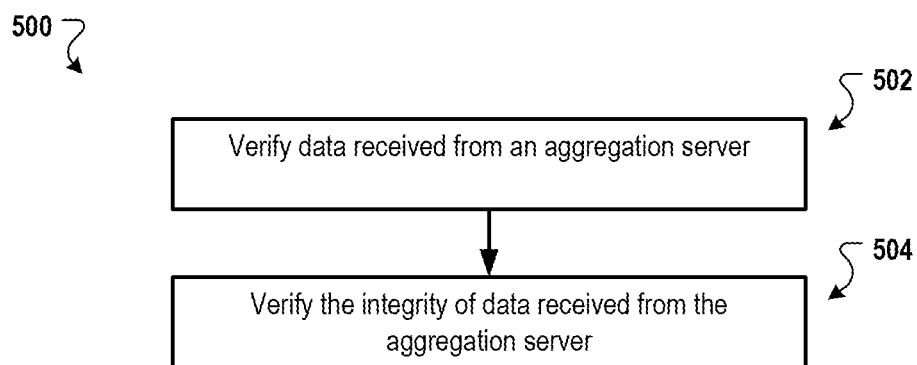
FIG. 5 is a flow diagram that illustrates an example process for verifying the integrity of data.

FIG. 5 is a flow diagram that illustrates an example process 500 for verifying the integrity of data. In particular, the process 500 can be performed by one of the aggregation servers 180-A or 180-B to verify the integrity of data received from the other aggregation server 180-A or 180-B during the MPC processes described in this document, e.g., the MPC processes of FIGS. 3 and 4 or the MPC processes described below. For ease of description, the process 500 is described in terms of the aggregation server 180-B verifying the integrity of the data received from the aggregation server 180-A. However, a similar process can be performed by the aggregation server 180-A to verify the integrity of data received from the aggregation server 180-B.

This process 500 can be used to prevent various types of fraud, including situations in which one of the aggregation servers 180-A or 180-B colludes with the fraud detection system 172, the conversion system 172, and the reporting system 190.

The aggregation server 180-B verifies data received from the aggregation server 180-A (502). The aggregation server 180-B can perform the step 502 as part of step 324 of the process 300. As described above with reference to step 318 of FIG. 3, the aggregation server 180-A can send, to the aggregation server 180-B, tuples of the form {count, ImpressionData$_3$', ConversionData$_2$'}. The aggregation server 180-B can encrypt the twice-encrypted conversion data ConversionData$_2$' in each tuple to generate thrice-encrypted conversion data ConversionData$_2$' for each tuple. This is possible due to the definition of the thrice-encrypted conversion data ConversionData$_3$, which is the deterministic public key encryption result of the thrice-encrypted conversion data ConversionData$_3$ using the public key of the aggregation server 180-A.

The aggregation server 180-B can transform each received tuple {count, ImpressionData$_3$', ConversionData$_2$'} to {count, ImpressionData$_3$', ConversionData$_3$'} and compare the resultant dataset that the aggregation server 180-B generated in step 316 of FIG. 3, after applying the thresholding and subsampling to achieve k-anonymity and differential privacy. For example, the aggregation server 180-B can compare the tuples {count, ImpressionData$_3$', ConversionData$_3$'} to the rows of Table 2. If the two datasets match, the aggregation server 180-B can be confident that the aggregation server 180-A has been honestly executing the crypto protocol up to step 322 of FIG. 3. Otherwise, the aggregation server 180-B can prematurely end the MPC process and/or report a possible malfunction of the aggregation server 180-A.

As described above with reference to the process 300, at the beginning of step 322, the aggregation server 180-A receives tuples in the form of {count, ImpressionData$_2$, ConversiodData$_3$'} from the aggregation server 180-B. The aggregation server 180-A can obtain its own dataset generated in step 314 of the process 300 after applying thresholding and subsampling. This dataset includes rows (e.g., in Table 2) or tuples in the form of {count, ImpressionData$_3$', ConversiodData$_3$'}. The aggregation server 180-A can use these pieces of data to infer a mapping between the thrice-encrypted impression data (ImpressionData$_3$,) and the twice-encrypted impression data (ImpressionData$_2$) of the two datasets.

Similar to the aggregation server 180-B, the aggregation server 180-A can verify that the thrice-encrypted impression data (ImpressionData$_3$,) is indeed the deterministic public key encryption result of the twice-encrypted impression data (ImpressionData$_2$) using the public key of the aggregation server 180-B. However, the aggregation server 180-A cannot recover the private key of the aggregation server 180-B given the mapping between the thrice-encrypted impression data (ImpressionData$_3$,) and the twice-encrypted impression data (ImpressionData$_2$) due to the design of the public key encryption algorithm. The worst thing that the aggregation server 180-A can do is send a fake tuple of data {count', ImpressionData$_1$', ConversionData$_{2'}$} rather than the actual tuple of data {count, ImpressionData$_1$, ConversionData$_2$} to the aggregation server 180-B.

The aggregation server 180-B verifies the integrity of data received from the aggregation server 180-A (504). The aggregation server 180-B can re-encrypt the encrypted impression data (ImpressionData$_1$) to twice-encrypted impression data (ImpressionData$_2$) using a deterministic public key algorithm and the public key of the aggregation server 180-A. The aggregation server 180-B can re-encrypt the twice-encrypted conversion data (ConversionData$_2$) to twice-encrypted impression data (ConversionData$_3$) using the deterministic public key algorithm and the public key of the aggregation server 180-A. The aggregation server 180-B can then transform each tuple {count, ImpressionData$_1$, ConversionData$_2$} received from the aggregation server 180-A in step 322 of the process 300 to tuples of the form tuple {count, ImpressionData$_1$, ConversionData$_2$} using the encryption results.

The aggregation server 180-B can then compare this resultant dataset of tuples to the dataset that the aggregation server 180-B generated and sent to the aggregation server 180-A in step 320 of the process 300. If the two datasets match, the aggregation server 180-B can be confident that the aggregation server 180-A has been honest executing the crypto protocol so far in the MPC process of the process 300. Otherwise, the aggregation server 180-B can prematurely end the MPC process and/or report a possible malfunction of the aggregation server 180-A.

As described above with reference to the process 300, at the beginning of step 326 of the process 300, the aggregation server 180-A receives, from the aggregation server 180-B, tuples {count, ImpressionData$_2$, ConversionData$_1$}. If the aggregation server 180-A does not honestly decrypt the twice-encrypted impression data (ImpressionData$_2$) to once-encrypted impression data (ImpressionData$_1$) in step 326 of the process 300 and send the correct tuples {count, ImpressionData$_1$, ConversionData$_1$} to the reporting system 190, the reporting system 190 will find the discrepancy between the two conversion reports received from the aggregation server 180-A and 180-B. The reporting system 190 can report the discrepancy to at least one of the aggregation servers 180-A and 180-B. In the event that the aggregation server 180-A does not collude with the reporting system 190, the most important information that the aggregation server 180-A can leak to the reporting system 190, which can comprehend the leaked information, includes a histogram of the counts and the conversion data of each tuple. However, the user privacy of this data is protected by the thresholding requirements and the differential privacy subsampling applied in steps 314 and 316 of the process 300.

Generating Sequences of Impressions and Conversions

Figure 6:
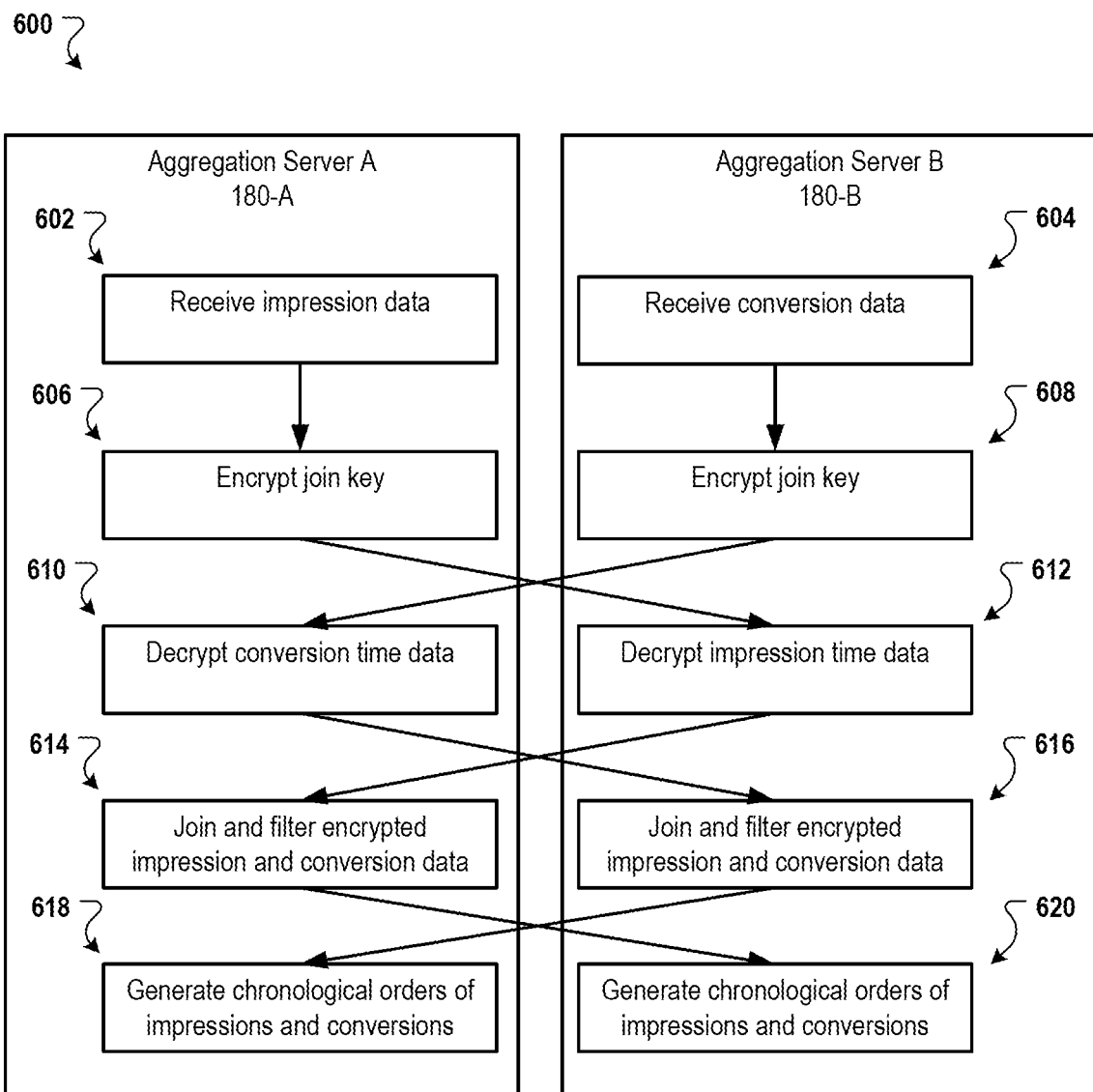
FIG. 6 is a flow diagram that illustrates an example process for generating chronological orders of events while protecting user privacy.

FIG. 6 is a flow diagram that illustrates an example process 600 for generating chronological sequences of events while protecting user privacy. The process 600 can be used to generate chronological sequences of impressions and/or conversions, which can be used to support different conversion attribution models such as last click attribution or rule-based attribution. The process 600 can be performed by the aggregation servers 180-A and 180-B.

Similar to the process 300, each aggregation server 180-A and 180-B can select a pair of secret encryption keys Key$_i$ (which represents a pair of keys) and Key$_c$ (which represents a pair of keys), respectively. The aggregation server 180-A can also select a secret key Key$_{i,\ skew}$. Similarly, the aggregation server 180-B can select a secret key Key$_{c,\ skew}$. The aggregation servers 180-A and 180-B can select new keys periodically based on a specified time period, per batch of impression or conversion data, or based on other appropriate criteria.

The aggregation server 180-A receives impression data (602). In this example, the impression data for each impression can include a blindly signed impression key (BlindlySignedKey(ID, dc_destination, report_domain)), thrice-encrypted impression data (ImpressionData$_{3p}$), and impression time data (ImpressionTime$_2$). The blindly signed impression key and the thrice-encrypted impression data can be the same or similar to the blindly signed impression key and the thrice-encrypted impression data of the process 300. The impression time data represents a time at which the impression occurred and can be encrypted.

The impression time data (ImpressionTime$_2$) can be twice-encrypted using the public key S$_i$ of the aggregation server 180-A and the public key of the aggregation server 180-B. For example, the impression time data (ImpressionTime$_2$) can be defined as PubKeyEncrypt(T(t$_m$+t$_{device}$), S$_i$), S$_c$). In this example, t$_m$ is the impression or click time (e.g., time at which the digital component was presented or interacted with) and t$_{device}$ is the clock skew of the client device 110 on which the application 112 that presented the digital component is installed. In this example, the sum of the two times is encrypted using an encryption technique T and the public key S$_i$ of the aggregation server 180-A. The encryption technique T can be a homomorphic, additive, probabilistic public key encryption technique (e.g., the Paillier cryptosystem). This encrypted value is then encrypted using the public key S$_c$ of the aggregation server 180-B. This second encryption can be a deterministic or probabilistic encryption technique.

The aggregation server 180-B receives conversion data (604). In the example, the conversion data can include a blindly signed conversion key (BlindlySignedKey(ID, conversion_domain, report_domain)), thrice-encrypted conversion data (ConversionData$_{3p}$), and conversion time data (ConversionTime$_2$). The blindly signed conversion key and the thrice-encrypted conversion data can be the same or similar to the blindly signed conversion key and the thrice-encrypted conversion data of the process 300. The conversion time data represents a time at which the conversion occurred and can be encrypted.

The conversion time data (ConversionTime$_2$) can be twice-encrypted using the public key S$_i$ of the aggregation server 180-A and the public key S$_c$ of the aggregation server 180-B. For example, the conversion time data (ConversionTime$_2$) can be represented by PubKeyEncrypt(T(z$_n$+t$_{device}$), S$_c$), S$_i$). In this example, z$_n$ is the conversion time (e.g., the time at which the conversion was completed) and t$_{device}$ is the clock skew of the client device 110 on which the application 112 that presented the digital component is installed. In this example, the sum of the two times is encrypted using an encryption technique T and the public key S$_c$ of the aggregation server 180-B. The encryption technique T can be a homomorphic, additive, probabilistic public key encryption technique (e.g., the Paillier cryptosystem). This encrypted value is then encrypted using the public key S$_i$ of the aggregation server 180-A. This second encryption can be a deterministic or probabilistic encryption technique.

For each impression, the aggregation server 180-A encrypts a join key using commutative encryption and its selected encryption key Key$_{i1}$ (606). Similar to the process 300, the join key for an impression can be the blindly signed join impression key (BlindlySignedKey(ID, dc_destination, report_domain)) for the impression. The aggregation server 180-A can then provide, for each impression, the encrypted join key, the thrice-encrypted impression data (ImpressionData$_{3p}$), and the twice-encrypted impression time data (ImpressionTime$_2$) to the aggregation server 180-B. In other words, the aggregation server 180-A can send, for each impression, a tuple: {H(BlindlySignedKey, Key$_{i1}$), ImpressionData$_{3p}$, ImpressionTime$_2$}. The tuples can be sent in a random or pseudo-random order.

For each conversion, the aggregation server 180-B encrypts a join key using commutative encryption and its selected encryption key Key$_{c1}$ (608). Similar to the process 300, the join key for a conversion is the blindly signed conversion key (BlindlySignedKey(ID, conversion_domain, report_domain)) for the conversion. The aggregation server 180-B can then provide, for each conversion, the encrypted join key, the thrice-encrypted conversion data (ConversionData$_{3p}$), and the twice-encrypted conversion-time data (ConversionTime$_2$) the aggregation server 180-A. In other words, the aggregation server 180-B can send, for each impression, a tuple: {H(BlindlySignedKey, Key$_c$), ConversionData$_{3p}$, ConversionTime$_2$}. The tuples can be sent in a random or pseudorandom order.

For each received tuple, the aggregation server 180-A decrypts the conversion time data (610). The aggregation server 180-A can decrypt the conversion time data (ConversionTime$_2$) using the private key corresponding to the public key S$_i$ of the aggregation server 180-A. This decryption recovers (T(z$_n$+t$_{device}$), S$_c$).

The aggregation server 180-A can also apply commutative encryption on top of the already commutatively encrypted blindly signed impression key (H(BlindlySignedKey, Key$_c$) using its selected encryption key Key$_{i2}$. The result of this is the encrypted blindly signed key ⊟(BlindlySignedKey).

The aggregation server 180-A can calculate a time skew value (time_skew$_i$). For example, the aggregation server 180-A can compute, as the time skew value (time_skew$_i$), an HMAC of the secret key Key$_{i, skew}$ and the encrypted blindly signed conversion key), e.g., HMAC$_{SHA256}$(Key$_{i, skew}$, ⊟(BlindlySignedKey).

The aggregation server 180-A can then generate, for each received tuple, once-encrypted conversion time data (ConversionTime$_1$). In some implementations, the once encrypted conversion time data (ConversionTime$_1$) is generated using the homomorphic, additive, probabilistic public key encryption technique T, e.g., T(z$_n$+t$_{device}$+time_skew$_i$, S$_c$). In this example, the sum of the conversion time (z$_n$), the clock skew of the client device (t$_{device}$), and the time skew value (time_skew$_i$) is encrypted using the public key S$_c$ of the aggregation server 180-B.

As described above with reference to step 310 of the process 300, the aggregation server 180-A can also decrypt and re-encrypt the thrice-encrypted conversion data (ConversionData$_{3p}$). That is, the aggregation server 180-A can decrypt the thrice-encrypted conversion data (ConversionData$_{3p}$) using its private key (the private key corresponding to public key S$_i$) to recover the twice-encrypted conversion data (ConversionData$_2$). The aggregation server 180-A can then re-encrypt the twice-encrypted conversion data (ConversionData$_2$) using its selected encryption key Key$_{i2}$, to get thrice-encrypted conversion data (ConversionData$_{3p}$).

The aggregation server 180-A can determine, for each unique thrice-encrypted conversion data (ConversionData$_{3p}$), a number of unique encrypted blindly signed conversion keys ⊟(BlindlySignedKey) associated with the thrice-encrypted conversion data (ConversionData$_{3p}$). If the number of unique encrypted blindly signed conversion keys ⊟(BlindlySignedKey) associated with the thrice-encrypted conversion data (ConversionData$_{3p}$) for a conversion meets a threshold (e.g., based on a thresholding requirement), the aggregation server 180-A sends, to the aggregation sever 180-B, a tuple {⊟(BlindlySignedKey), ConversionData$_{3p}$, ConversionTime$_1$}.

For each received tuple, the aggregation server 180-B decrypts the impression time data (612). The aggregation server 180-B can decrypt the impression time data (ImpressionTime$_2$) using the private key corresponding to the public key S$_c$ of the aggregation server 180-B. This decryption recovers (T(t$_m$+t$_{device}$), S$_i$).

The aggregation server 180-B can also apply commutative encryption on top of the already commutatively encrypted blindly signed conversion key (H(BlindlySignedKey, Key) using its selected encryption key Key$_{c2}$. The result of this is the encrypted blindly signed key ⊟(BlindlySignedKey).

The aggregation server 180-B can calculate a time skew value (time_skew$_c$). For example, the aggregation server 180-B can compute, as the time skew value (time_skew$_c$), an HMAC of the secret key Key$_s$, skew and the encrypted blindly signed conversion key, e.g., HMAC$_{SHA256}$(Key$_{c, skew}$, ⊟(BlindlySignedKey).

The aggregation server 180-B can then generate, for each received tuple, once-encrypted impression time data (Impression Time$_1$). In some implementations, the once-encrypted conversion time data (ImpressionTime$_1$) is generated using the homomorphic, additive, probabilistic public key encryption technique T, e.g., T(t$_m$+t$_{device}$+time_skew$_c$, S$_i$). In this example, the sum of the impression time (t$_m$), the clock skew of the client device (t$_{device}$), and the time skew value (time_skew$_c$) is encrypted using the public key S$_i$ of the aggregation server 180-A.

As described above with reference to step 312 of the process 300, the aggregation server 180-B can also decrypt and re-encrypt the thrice-encrypted impression data (ImpressionData$_{3p}$). That is, the aggregation server 180-B can decrypt the thrice-encrypted conversion data (ImpressionData$_{3p}$) using its private key (the private key corresponding to public key S$_c$) to recover the twice-encrypted impression data (ImpressionData$_2$). The aggregation server 180-A can then re-encrypt the twice-encrypted impression data (ImpressionData$_2$) using its selected encryption key Key$_{c2}$, to get thrice-encrypted impression data (ImpressionData$_{3p}$).

The aggregation server 180-B can determine, for each unique thrice-encrypted impression data (ImpressionData$_{3p}$), a number of unique encrypted blindly signed conversion keys ⊟(BlindlySignedKey) associated with the thrice-encrypted impression data (ImpressionData$_{3p}$). If the number of unique encrypted blindly signed conversion keys ⊟(BlindlySignedKey) associated with the thrice-encrypted impression data (ImpressionData$_{3p}$) for an impression meets a threshold (e.g., based on a differential privacy thresholding requirement), the aggregation server 180-B sends, to the aggregation sever 180-A, a tuple {⊟(BlindlySignedKey, Key$_i$), ImpressionData$_3$, Impression Time$_1$}.

The aggregation server 180-A joins and filters the encrypted impression and conversion data received from the aggregation server 180-B (614). The aggregation server 180-A can join the tuples {⊟(BlindlySignedKey, Key$_i$), ImpressionData$_3$, Impression Time$_1$} received from the aggregation server 180-A with the tuples {⊟(Blindly- SignedKey), ConversionData$_{3p}$, ConversionTime$_l$} that the aggregation server 180-A generated in step 610 using the encrypted blindly signed keys (H(BlindlySignedKey)). For each encrypted blindly signed key (H(BlindlySignedKey)), the aggregation server 180-A forms a tuple or row in a table that includes {H(BlindlySignedKey), ImpressionData$_{3p}$, ImpressionTime$_1$, ConversionData$_{3p}$, ConversionTime$_1$}.

As an application 112 can report multiple impressions for the same digital component, there can be multiple occurrences of the impression data (ImpressionData$_3$) for each encrypted blindly signed key (H(BlindlySignedKey). The aggregation server 180-A can decrypt the once-encrypted impression time data (ImpressionTime$_1$) using its public key S$_i$ for each thrice-encrypted impression data (ImpressionData$_{3p}$) having the same encrypted blindly signed key (H(BlindlySignedKey) and the same thrice-encrypted conversion data (ConversionData$_{3p}$) to obtain unencrypted time data (ImpressionTime$_0$), which includes t'$_m$=t$_m$+t$_{device}$+time_skew$_c$. The aggregation server 180-A does not know the value of time_skew$_c$. If same-device attribution is being used, the clock skew of the device (t$_{device}$) is fixed but unknown to the aggregation server 180-A. If cross-device attribution is being used, the clock skew of the device (t$_{device}$) for different impressions associated with the same encrypted blindly signed key (H(BlindlySignedKey) can be different since the data can come from multiple devices, and are unknown to the aggregation server 180-A. In either case, the aggregation server 180-A cannot infer the impression/click time (t$_m$) from t'$_m$ and therefore cannot easily launch time-based attacks to track the user.

The aggregation server 180-A can determine an impression time (ImpressionTime$_0$) as t$_m$+t$_{device}$+time_skew$_c$+time_skew$_i$. For each combination of joined impression data (ImpressionData$_{3p}$) and conversion data (ConversionData$_{3p}$), the aggregation server 180-A can determine whether the number of unique encrypted blindly signed keys (H(BlindlySignedKey)) meets or exceeds a threshold (e.g., a k-anonymity privacy threshold). If so, the aggregation server 180-A can send, for the combination, a tuple {(H(BlindlySignedKey)), ImpressionData$_{3p}$, ImpressionTime$_0$} to the aggregation server 180-B. In some implementations, the aggregation server 180-A can also use subsampling techniques for differential privacy, as described above with reference to the process 300.

The aggregation server 180-B also joins and filters the encrypted impression and conversion data received from the aggregation server 180-A (616). The aggregation server 180-B can join the tuples {H(BlindlySignedKey), ConversionData$_3$, Conversion Time$_1$} received from the aggregation server 180-A with the tuples {H(BlindlySignedKey, Key), ImpressionData$_3$, Impression Time$_1$} that the aggregation server 180-B generated in step 612 using the encrypted blindly signed keys (H(BlindlySignedKey)). For each encrypted blindly signed key (H(BlindlySignedKey)), the aggregation server 180-A forms a tuple or row in a table that includes {H(BlindlySignedKey), ImpressionData$_{3p}$, ImpressionTime$_1$, ConversionData$_{3p}$, ConversionTime$_1$}.

The aggregation server 180-B can also decrypt the once-encrypted conversion time data (ConversionTime$_1$) using its public key S$_c$ for each thrice-encrypted impression data (ImpressionData$_{3p}$) having the same encrypted blindly signed key (H(BlindlySignedKey) and the same thrice-encrypted conversion data (ConversionData$_{3p}$) to obtain unencrypted time data (CompressionTime$_0$), which includes t'$_m$=t$_m$+t$_{device}$+time_skew$_i$.

The aggregation server 180-B can determine a conversion time (ConversionTime$_0$) as z$_n$+t$_{device}$+time_skew$_i$+time_skew$_c$. For each combination of joined impression data (ImpressionData$_{3p}$) and conversion data (ConversionData$_{3p}$), the aggregation server 180-B can determine whether the number of unique encrypted blindly signed keys (H(BlindlySignedKey)) meets or exceeds a threshold (e.g., a k-anonymity privacy threshold). If so, the aggregation server 180-B can send, for the combination, a tuple {(H(BlindlySignedKey)), ConversionData$_{3p}$, ConversionTime$_0$} to the aggregation server 180-A. In some implementations, the aggregation server 180-B can also use subsampling techniques for differential privacy, as described above with reference to the process 300.

At this point, both aggregation servers 180-A and 180-B can use encrypted blindly signed keys H(BlindlySignedKey) to join both impression and conversion data and times to form, for each unique encrypted blindly signed key H(BlindlySignedKey), records of the following form: {(H(BlindlySignedKey)), ImpressionData$_{3p}$, ImpressionTime$_0$, ConversionData$_{3p}$, ConversionTime$_0$}.

The aggregation server 180-A generates chronological orders of impressions and conversions (618). For each unique encrypted blindly signed key (H(BlindlySignedKey)), the aggregation server 180-A can compare the impression time (ImpressionTime$_0$) for each piece of impression data (ImpressionData$_{3p}$) and the conversion time (ConversionTime$_0$) for each piece of conversion data (ConversionData$_{3p}$) to generate a chronological sequence of impression(s) and conversion(s) for the encrypted blindly signed key (H(BlindlySignedKey)) using the times.

The aggregation server 180-B generates chronological orders of impressions and conversions (620). For each unique encrypted blindly signed key (H(BlindlySignedKey)), the aggregation server 180-A can compare the impression time (ImpressionTime$_0$) for each piece of impression data (ImpressionData$_{3p}$) and the conversion times (ConversionTime$_0$) for each piece of conversion data (ConversionData$_{3p}$) to generate a chronological sequence of impression(s) and conversion(s) for the encrypted blindly signed key (H(BlindlySignedKey)) using the times.

As each unique encrypted blindly signed key (H(BlindlySignedKey)) corresponds to a particular digital component and a particular unique identifier (ID), the chronological sequence for the encrypted blindly signed key (H(BlindlySignedKey)) includes one or more impression(s) of the digital component for the unique identifier (e.g., at one or more devices of the user corresponding to the unique identifier) and one or more conversion(s) resulting from presentation of the particular digital component. For example, the sequence can include multiple impressions if the particular digital component was presented to the same user multiple times and the sequence can include multiple conversions of different types (e.g., one for adding an item to a virtual cart and one for completing the acquisition of the item).

The chronological orders enable the aggregation servers 180-A and 180-B to independently perform attribution processes to attribute conversions to impressions. For example in a last click attribution model, the aggregation servers 180-A and 180-B can identify the last impression that includes a click prior to a conversion in a sequence and attribute the conversion to the last impression. The aggregation servers 180-A and 180-B can also verify each other's results, e.g., by comparing its results to the results of the other aggregation server. Although not shown in FIG. 6, the aggregation servers 180-A and 180-B can work together to decrypt the impression and conversion data, as described above with reference to steps 318-332 of FIG. 3. The aggregation servers 180-A and 180-B can report the attributions along with the other data in the conversion reports.

Some additional steps can be taken to prevent or detect time-interval based attacks. For multiple impressions/clicks associated with the same encrypted blindly signed key ( Ħ(BlindlySignedKey)), the aggregation server 180-A will have $t'_m$, where m is an integer. Assuming that $t'_m$ are chronologically ordered from oldest to the most recent, the aggregation server 180-A can calculate the time interval $\delta'$ between two adjacent impressions, e.g., $\delta'_m = t'_{m+1} - t'_m$. Assuming that $t_{device}$ is small enough, $\delta'_m \approx \delta_m = t'_{m+1} - t'_m$. If a digital component distribution system serves a series of impressions to a user, the digital component distribution system could record the time intervals between two adjacent impressions, i.e., $\delta_m$. Based on the above, the digital component distribution system might be able to recognize an individual user based on time interval if the digital component distribution system colludes with the aggregation server 180-A. The digital component distribution system could also launch a similar time-interval based attached if the digital component distribution system colludes with the aggregation server 180-B.

One option to deter these time-interval based attacks is using a monotonically increasing function $\Gamma$ that has the following properties. Given two arbitrary numbers a and b, two values a-b, and $\Gamma(a)-\Gamma(b)$ are not correlated. That is, knowing a-b does not help predicting $\Gamma(a)-\Gamma(b)$, and vice versa.

With the function $\Gamma$, the impression time data (ImpressionTime$_2$) can be defined as PubKeyEncrypt($T(\Gamma(t_m + t_{device}) S_i) S_c$). In this example, $\delta'_m = \Gamma(t_{m+1} + t_{device} + \text{skew}) - \Gamma(t_m + t_{device} + \text{skew})$. Thus, $\delta'_m \neq \delta_m$ and the time-interval based attack is broken.

Another option for deterring the time-interval based attacks is to modify the process 600 to include a dedicated time server 192. At the beginning of the process 600, the aggregation server 180-A receives impression data in the form {BlindlySignedKey(ID, dc_destination, report_domain), ImpressionData$_{3p}$, T($t_m + t_{device}$, S$_{time}$)}. In this example, the sum of the impression/click time $t_m$ and the clock skew of the device $t_{device}$ is encrypted using a public key S$_{time}$ of the time server 192. For example, the application 112 or the client device 110 can encrypt the time data using the public key S$_{time}$. Similarly, the aggregation server 180-B receives conversion data in the form {BlindlySignedKey(ID, conversion_domain, report_domain), ConversionData$_{3p}$, T($z_n + t_{device}$, S$_{time}$)}. In this example, the sum of the conversion time $z_n$ and the clock skew of the device $t_{device}$ is encrypted using the public key S$_{time}$ of the time server 192. For example, the application 112 or the client device 110 can encrypt the time data using the public key S$_{time}$.

In modified step 606, the aggregation server 180-A can instead send, to the aggregation server 180-B, tuples of the form {H(BlindlySignedKey, S$_i$), ImpressionData$_{3p}$, T($t_m + t_{device}$, S$_{time}$)}. That is, the aggregation server 180-A can encrypt the blindly signed key with a secret key S$_i$ and pass-through the impression and time data as-is.

Similarly, in modified step 608, the aggregation server 180-B can instead send, to the aggregation server 180-A, tuples of the form {H(BlindlySignedKey, S$_c$), ImpressionData$_{3p}$, T($z_n + t_{device}$, S$_{time}$)}. That is, the aggregation server 180-B can encrypt the blindly signed key with a secret key S$_c$ and pass-through the impression and time data as-is.

In modified step 610, the aggregation server 180-A can generate and send, to the aggregation server 180-B tuples of the form {H(BlindlySignedKey), ConversionData$_3$, T($Z_n + t_{device} + \text{time\_skew}_i$, S$_{time}$)}. In this example, the probabilistic encryption that was applied to the conversion data (ConversionData$_{3p}$) is replaced with deterministic encryption to create (ConversionData$_3$). In addition, the aggregation server 180-A can add random noise to the encrypted impression time where the noise is cryptographically derived from H(BlindlySignedKey) and the secret key S$_i$. Similarly, in step 612, the aggregation server 180-B can generate and send, to the aggregation server 180-A, tuples of the form {H(BlindlySignedKey), ImpressionData$_3$, T($t_m + t_{device} + \text{time\_skew}_c$, S$_{time}$)}.

In modified step 614, the aggregation server 180-A can join and filter the dataset, as described above with reference to original step 614 of the process 600. Rather than determine the impression time (ImpressionTime$_0$) as $t_m + t_{device} + \text{time\_skew}_c + \text{time\_skew}_i$, the aggregation server 180-A can determine an encrypted impression time value (ImpressionTime$_{3\_skew}$). For example, the encrypted impression time value (ImpressionTime$_{3\_skew}$) can be defined as T($t_m + t_{device} + \text{time\_skew}_c + \text{time\_skew}_i$, S$_{time}$). That is, the encrypted impression time value (ImpressionTime$_{3\_skew}$) is the sum of the time values encrypted using the homomorphic, additive, probabilistic public key encryption technique T and the public key S$_{time}$ of the time server 192.

For each combination of joined impression data (ImpressionData$_3$) and conversion data (ConversionData$_3$), the aggregation server 180-A can determine whether the number of unique encrypted blindly signed keys ( Ħ(BlindlySignedKey)) meets or exceeds a threshold (e.g., a differential privacy threshold). If so, the aggregation server 180-A can send, for the combination, a tuple {(Ħ(BlindlySignedKey)), ImpressionData$_3$, ImpressionTime$_{3\_skew}$} to the aggregation server 180-B.

In modified step 616, the aggregation server 180-B can join and filter the dataset, as described above with reference to original step 616 of the original process 600. Rather than determine the impression time (ConversionTime$_0$) as $z_n + t_{device} + \text{time\_skew}_c + \text{time\_skew}_i$, the aggregation server 180-B can determine an encrypted conversion time value (ConversionTime$_{3\_skew}$). For example, the encrypted conversion time value (ConversionTime$_{3\_skew}$) can be defined as T($z_n + t_{device} + \text{time\_skew}_c + \text{time\_skew}_i$, S$_{time}$). That is, the encrypted conversion time value (ConversionTime$_{3\_skew}$) is the sum of the time values encrypted using the homomorphic, additive, probabilistic public key encryption technique T and the public key S$_{time}$ of the time server 192.

For each combination of joined impression data (ImpressionData$_{3p}$) and conversion data (ConversionData$_3$), the aggregation server 180-B can determine whether the number of unique encrypted blindly signed keys (Ħ(BlindlySignedKey)) meets or exceeds a threshold (e.g., a differential privacy threshold). If so, the aggregation server 180-B can send, for the combination, a tuple {(Ħ(BlindlySignedKey)), ConversionData$_3$, ConversionTime$_{3\_skew}$} to the aggregation server 180-A.

At this point, both aggregation servers 180-A and 180-B can use encrypted blindly signed keys Ħ(BlindlySignedKey) to join both impression and conversion data and times to form, for each unique encrypted blindly signed key Ħ(BlindlySignedKey), records of the following form: {Ħ(BlindlySignedKey), ImpressionData$_3$, ImpresionTime$_{3\_skew}$, ConversionData$_3$, ConversionTime$_{3\_skew}$}.

Within each record composed of multiple pieces of impression data (ImpressionData$_3$) and multiple pieces of conversion data (ConversionData$_3$), associated with the same or multiple encrypted blindly signed keys ⊞(BlindlySignedKey), the aggregation server 180-A can assign random or pseudo random indices to the encrypted time values (ImpresionTime$_{3\_skew}$ and ConversionTime$_{3\_skew}$). The aggregation server 180-A can send these indices together with the encrypted time values (but not the blindly signed keys or impression or conversion data) to the time server 192. The time server 192 can decrypt the encrypted time values using the private key corresponding to the public key S$_{time}$, order these decrypted, but triple-skewed time values, and send the indices back to the aggregation server 180-A in chronological order.

In this way, the time server 192 does not have access to any user data. The time server 192 does not even have access to the purpose of the triple-skewed time values, or whether the collection of triple-skewed time values are associated with the same encrypted blindly signed key ⊞(BlindlySignedKey). Without colluding with the aggregation server 180-A, the time server 192 cannot launch a time or time-interval based attacked.

The aggregation server 180-A can order the impression data ImpressionData$_3$) and conversion data (ConversionData$_3$) for each record using the indices of the encrypted time values corresponding to the data. With this order, the aggregation server 180-A can perform attribution processes to attribute conversions to impressions, as described above. The aggregation server 180-B can perform the same process of assigning indices to the encrypted time values and interacting with the time server 192 to order the data for attribution. When both aggregation servers 180-A and 180-B have completed this process, the aggregation servers 180-A and 180-B can compare the results.

Data Driven Attribution

The MPC processes described in this document, e.g., the process 300 of FIG. 3, can be adapted to support data driven attribution (DDA). Data-driven attribution gives credit to digital components, campaigns, and/or search keywords for conversions based on the actions of the users. For example, DDA can use conversion data to calculate the actual contribution of each keyword across a conversion path that leads to a conversion. This works by reporting full paths that meet aggregation thresholds to the reporting system 190, for later processing to apply credit.

Figure 7:
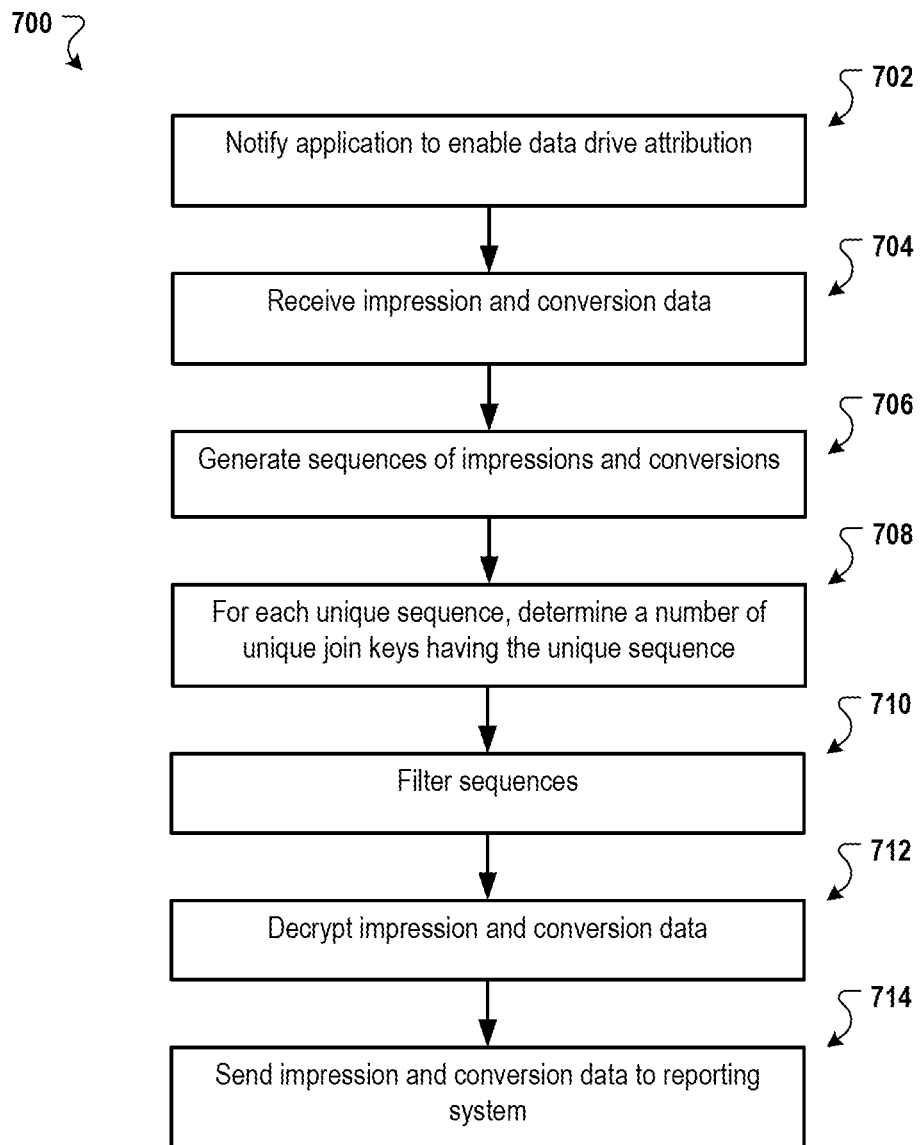
FIG. 7 is a flow diagram that illustrates an example process for attributing conversions to impressions using data driven attribution.

FIG. 7 is a flow diagram that illustrates an example process 700 for attributing conversions to impressions using data driven attribution. The process 700 can be performed by the aggregation servers 180-A and 180-B of FIGS. 1 and 2.

To track the DDA, digital components and/or the conversion system 190 can notify an application 112 of a client device 110 to enable DDA (702). When DDA is enabled, the application 112 can modify the definition of the blindly signed join keys to take into account whether a digital component is clicked or otherwise interacted with. For clicked impressions of digital components, the application 112 can modify the definition of the blindly signed impression key (BlindlySignedKey(ID, dc_destination, report_domain)) for each impression as BlindlySignedKey(ID-∥clicked, dc_destination, report_domain). In this definition, the blindly signed impression key is a complex message that includes a one-way crypto hash function that maps the complex message (ID∥clicked, dc_destination, report_domain) to a hash value and the blind signature (blind_singature) for the blindly signed impression key. In cases in which the DDA only considers clicked (or interacted with) impressions, the parameter clicked will always be true or have a value of one.

Impression and conversion data is received (704). For example, as described above, the aggregation server 180-A can receive the impression data and the aggregation server 180-B can receive the conversion data, e.g., in batches. When the application 112 reports impressions as described above, the application 112 can send, to the aggregation server 180-A, impression data M, that includes the blindly signed join key (BlindlySignedKey) and the thrice-encrypted impression data (ImpressionData$_{3p}$). Similarly, when the application 112 reports conversions as described above, the application 112 can send, to the aggregation server 180-B, conversion data M$_c$ that includes blindly signed join key (BlindlySignedKey) and the thrice-encrypted conversion data (ConversionData$_{3p}$). In this example, the blindly signed keys are the modified versions that take the parameter clicked into consideration.

Sequences of impressions and conversions are generated (706). Before generating the sequences, each aggregation server 180-A and 180-B can join and filter the data, as described above with reference to steps 306-316 of the process 300. After the joining and filtering is complete, each of the aggregation servers has a record for each unique blindly signed join key (BlindlySignedKey) associated with a given user of the following form: {ImpressionData$_{3,1}$, ImpressionData$_{3,2}$, ImpressionData$_{3,i}$, . . . , ConversionData$_3$}. In this form, the impressions and conversion(s) can be chronologically ordered. This chronologically ordered sequence for a blindly signed join key (BlindlySignedKey) can be referred to as a Sequence.

For each unique Sequence, both aggregation servers 180-A and 180-B determine a number of a blindly signed join keys (BlindlySignedKey) having the unique sequence (708). For example, multiple users may have clicked on the same digital components in the same order prior to a conversion event. In such cases, the sequence of impressions and conversion would have a unique blindly signed join key (BlindlySignedKey) for each user.

The Sequences are filtered (710). For example, each aggregation server 180-A and 180-B can filter the Sequences based on a privacy or other thresholding requirement. In a particular example, the aggregation servers 180-A and 180-B can filter, from the Sequences, each Sequence that does not have at least a threshold number of unique blindly signed join keys (BlindlySignedKey). The result of this is a list of {Occurrence$_m$, Sequence$_m$} pairs, where m=1, 2, . . . M.

The impression and conversion data is decrypted (712). The impression and conversion data can be decrypted using the MPC process of steps 318-328 of the process 300. The decryption results in tuples of the form {Occurrence$_1$, Impression$_{1,1}$, . . . ImpressionData$_{1,?}$, ConversionData$_{1,1}$}, {Occurrence$_2$, ImpressionData$_{1,2}$, . . . ImpressionData$_{1,?}$, ConversionData$_{1,2}$}. Each tuple includes its sequence of impression and conversion data, once-encrypted using the public key of the reporting domain 190.

The impression and conversion data is sent to their respective reporting systems (714). The reporting system 190 can then apply their DDA techniques (e.g., Shapley Value), to the final set of sequences to allocate credit.

As DDA is a cross-site reporting among multiple domains, the number of distinct sequences that can satisfy threshold requirements may be low, especially if a lot of information is encoded in the impression and/or conversion data, resulting in many different occurrences of each impression data (ImpressionData$_{3p}$) and many different occurrences of conversion data (ConversionData$_{3p}$). In such cases, differential privacy noise can be added to the number of occurrences of each Sequence in the final measurement report to protect user privacy, which may be low utility to digital component providers.

This utility can be improved while still protecting user privacy by reducing the entropy of the impression data (ImpressionData$_{3p}$) and/or conversion data (ConversionData$_{3p}$), or by enlarging the reporting window. If the order of impression data is not significant, or duplicated impression data can be ignored, the digital component provider can notify the aggregation servers 180-A and 180-B at the conversion site. In this case, the aggregation servers 180-A and 180-B will count the number of unique blindly signed join keys (BlindlySignedKey) associated with each Set(Sequence), and apply thresholding and subsampling accordingly.

Determining Aggregate Conversion Values

The MPC processes described in this document, e.g., the process 300 of FIG. 3, can be adapted to support reporting conversion values in addition to the number of conversions and impressions. For each conversion, advertisers can attached a numeric conversion value, e.g., the amount spent on a digital component provider's web site. Assuming that for a particular impression and conversion pair, there are n conversions with the corresponding numeric conversion value attached $\{V_1, V_2, \ldots V_n\}$. The number of conversions is $A_0 = \Sigma_{i=1}^{n}(V_i)^0$. The total conversion value is $A_1 = \Sigma_{i=1}^{n}(V_i)^1$. The sum of the square of conversion value is $A_2 = \Sigma_{i=1}^{n}(V_i)^2$. The average of conversion value is $$\frac{A_1}{A_0}$$

and the variance is $$\frac{A_2}{A_0} - \left(\frac{A1}{A0}\right)^2.$$

To compare the effectiveness of two campaigns, one could assume that the distribution of conversion value (if conversion occurs) follows a normal distribution and then compare whether there are significant differences between two normal distributions. To do so, the second moment variance ($A_{i,2}$) is needed.

To enable the aggregation servers 180-A and 180-B to calculate the conversion value ($A_1$) securely, a commutative encryption technique H that supports numeric addition operations can be used. That is, for two arbitrary integer values x and y, $H(x+y) = \text{HomomorphicAddition}(H(x), H(y))$. Given that the reporting system 190 calculates the number of conversion $A_0$, this is a secure way to get the total conversion value $A_1$ and calculate the average in the clear.

Figure 8:
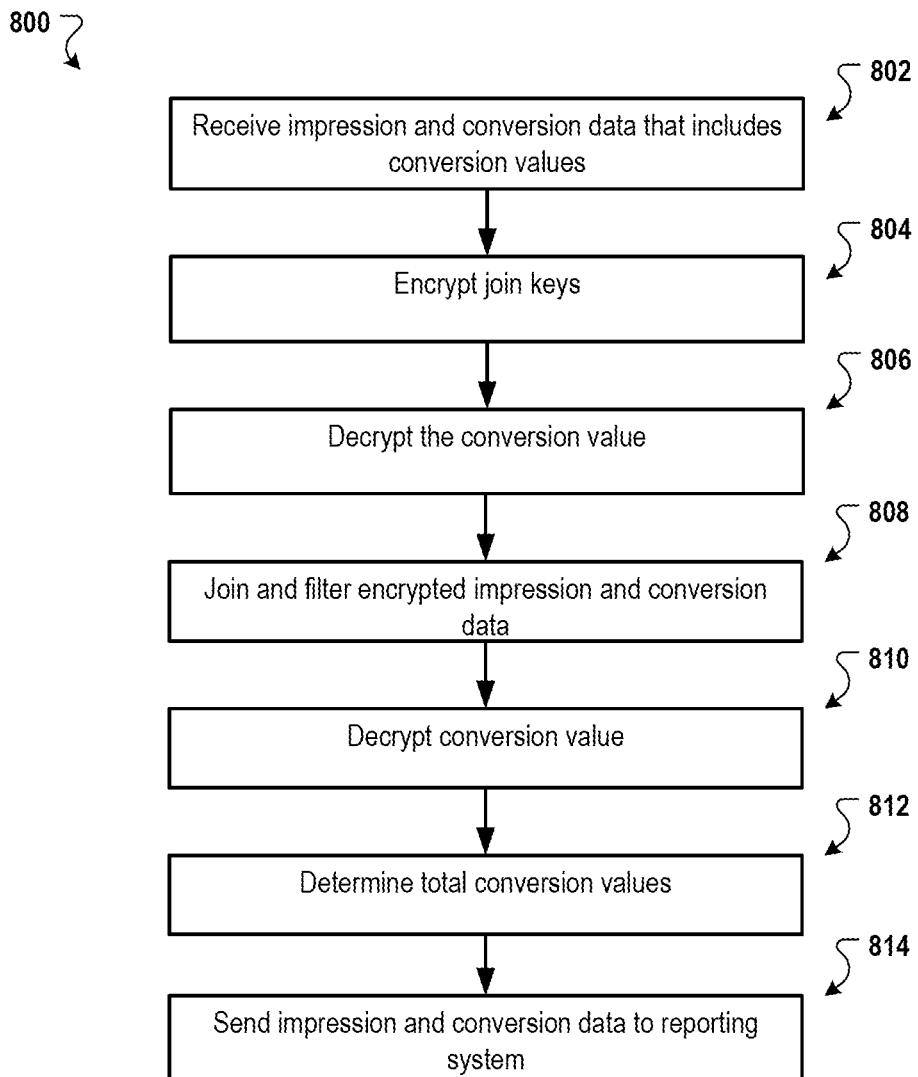
FIG. 8 is a flow diagram that illustrates an example process for determining aggregate conversion values.

FIG. 8 is a flow diagram that illustrates an example process 800 for determining aggregate conversion values. The process 800 can be performed by the aggregation servers 180-A and 180-B of FIGS. 1 and 2.

Impression and conversion data is received (802). For example, as described above, the aggregation server 180-A can receive the impression data and the aggregation server 180-B can receive the conversion data, e.g., in batches, from client devices. When the application 112 reports impressions as described above, the application 112 can send, to the aggregation server 180-A, impression data $M_i$ that includes the blindly signed join key (BlindlySignedKey) and the thrice-encrypted impression data (ImpressionData$_{3p}$).

Similarly, when the application 112 reports conversions as described above, the application 112 can send, to the aggregation server 180-B, conversion data $M_c$ that includes blindly signed join key (BlindlySignedKey) and the thrice-encrypted conversion data (ConversionData$_{3p}$). In this example, the blindly signed keys are the modified versions that take the parameter clicked into consideration. However, in this example, the conversion data $M_c$ can also include, for the conversion, the conversion value (V) and/or the conversion value square ($V^2$). To generalize, the conversion data $M_c$ can include any number of conversion values $V_1$, $V_2, \ldots V_n$, as designated by $V_i$. One of those $V_i$ could be the square of another $V_j$.

Rather than send the actual values $V_i$, the application 112 can send encrypted versions of the values $V_i$. In some implementations, the conversion system 172 can encrypt the values $V_i$ with probabilistic homomorphic additive public key encryption H, e.g., the Pailler cryptosystem) and sends $H(V_i, \text{report\_domain})$ to the application 112. In this example, the values are combined with the reporting domain (report_domain) that will receive conversion reports for the digital component and encrypted using the encryption technique H.

The application 112 can receive $H(V_i, \text{report\_domain})$ and generate one or more thrice-encrypted conversion values and a thrice-encrypted squared conversion value. For example, the application 112 can generate, as the thrice-encrypted conversion value, PublicKeyEncrypt($H(V_i, \text{report\_domain}), S_c, S_i$). In this example, the encrypted conversion value received from the conversion system 172 is encrypted using the public key $S_c$ of the aggregation server 180-B and this result is encrypted using the public key $S_i$ of the aggregation server 180-A. This thrice-encrypted conversion value can also be referred to as ConversionValue$_{3p}$ as the third encryption can be probabilistic.

The blindly signed join keys are encrypted (804). For example, the aggregation server 180-A can encrypt the blindly signed join keys (BlindlySignedKey) in the received impression data using commutative encryption and its selected encryption key Key$_{i1}$, as described above with respect to step 306 of the process 300. The aggregation server 180-A can then send, for each impression, a pair: $\{H(\text{BlindlySignedKey}, \text{ImpressionData}_{3p}\}$ to the aggregation server 180-B.

Similarly, the aggregation server 180-B can encrypt the blindly signed join keys (BlindlySignedKey) in the received conversion data using commutative encryption and its selected encryption key Key$_{c1}$, as described above with respect to step 308 of the process 300. The aggregation server 180-A can then send, for each conversion, a tuple: $\{H(\text{BlindlySignedKey}, \text{Key}_c), \text{ConversionData}_{3p}, \text{ConversionValue}_{3p}\}$ to the aggregation server 180-A.

The conversion value (ConversionValue$_{3p}$) is decrypted (806). For example, the aggregation server 180-A can decrypt the conversion value (ConversionValue$_{3p}$) using the private key that corresponds to the public key $S_i$. This results in the recovery of twice-encrypted conversion value (ConversionData$_2$), which is defined by PubKeyEncrypt($H(V_i, \text{report\_domain}), S_c$). The aggregation server 180-B can keep this twice-encrypted conversion value (ConversionData$_2$) locally.

The encrypted impression and conversion data is joined and filtered (808). For example, each aggregation server 180-B can join and filter the data. In this example, the aggregation server 180-A can join the conversion value (ConversionValue$_2$), conversion data (ConversionData$_3$) and impression data (ImpressionData$_3$) using the blindly signed keys (H(BlindlySignedKey), similar to step 314 of the process 300, but with the additional conversion value (ConversionValue$_2$). The aggregation server 180-A can then filter the joined records based on a threshold, similar to in step 314 of the process 300. For example, the aggregation server 180-A can filter, from the dataset, joined records of {ConversionValue$_2$, ConversionData$_3$, ImpressionData$_3$} that have a number of unique blindly signed keys (H(BlindlySignedKey) that fails to meet or exceed the threshold.

For each remaining joined record, the aggregation server 180-A can generate a key/value pair. In this example, the key can be a crypto hash of the blindly signed keys (H(BlindlySignedKey)), the thrice-encrypted impression data (ImpressionData$_3$), and the thrice-encrypted conversion data (ConversionData$_3$). The value can be the twice-encrypted conversion value (ConversionValue$_2$). This key/value pair can be defined as {CrytpoHash(H(Key), ImpressionData$_3$, ConversionData$_3$), ConversionValue$_2$}. The aggregation server 180-A can send the key/value pairs to the aggregation server 180-B.

The aggregation server 180-B can perform the same filtering on its data, to generate a dataset that includes the same set of tuples {H(Key), ImpressionData$_3$, ConversionData$_3$} that remain after the filtering. The aggregation server 180-B can perform the same crypto hash on the tuples, e.g., CrytpoHash(H(Key), ImpressionData$_3$, ConversionData$_3$) to get keys for each tuple. The aggregation server 180-B can join this data with the key/value pairs received from the aggregation server 180-A by matching the generated keys to the keys of the key/value pairs.

The twice-encrypted conversion value (ConversionValue$_2$) is decrypted (810). The aggregation server 180-B can decrypt the twice-encrypted conversion value (ConversionValue$_2$) using its private key that corresponds to the public key $S_c$ to recover the once-encrypted conversion value (Conversion Value$_1$), which is encrypted once using the public key of the reporting system 190, as described above. The aggregation server 180-B can send each once-encrypted conversion value (Conversion Value$_1$) and its key (CrytpoHash(H(Key), ImpressionData$_3$, ConversionData$_3$)) to the aggregation server 180-A.

The total conversion values are determined (812). Each aggregation server 180-A and 180-B can determine the total conversion value for each record having the same impression data (ImpressionData$_3$) and conversion data (ConversionData$_3$). That is, for each joined combination of ImpressionData$_3$ and ConversionData$_3$, the aggregation servers 180-A and 180-B can independently determine the sum of the conversion values (Conversion Value$_1$). As the conversion values are encrypted, the sum can be determined by as H($\Sigma$V, report_domain).

The impression and conversion data, including the total conversion value, is sent to the reporting system (814). For example, the aggregation servers 180-A and 180-B can use the MPC process described in steps 318-328 to decrypt the impression and conversion data. Each aggregation server 180-A can then generate and send, to the reporting system 190 for each impression and conversion pair, a report that includes impression data (ImpressionData$_1$), conversion data (ConversionData$_1$), the count of the number of conversions (count), and the conversion values (H($\Sigma$V, report_domain)) ... (H($\Sigma$V$_n$, report_domain)). For example, there could be multiple summed values, one for the sum of the conversion values and one for the sum of the square of the conversion values, e.g., sum(V$_1$) and sum(V$_2$) where $V_2=V_1^2$.

The reporting system 190 can compare the two reports from the two aggregation servers 180-A and 180-B to ensure that they match. If they match, the reporting system 190 can verify the blind signature from the fraud detection system 170 and the conversion server's signature on the conversion data $m_c$. If both signatures are verified, the reporting system 190 can decrypt the data in the conversion report to recover {mi∥clicked, $m_c$, count, $\Sigma$V ... $\Sigma$V$_n$ for each impression and conversion pair using its private key that corresponds to its public key used to encrypt the data. That is, the reporting system 190 can recover the impression data ($m_i$), whether the digital component was clicked, the conversion data ($m_c$), the count of the number of conversions (count), and the total conversion values for each impression and conversion pair.

Differential Privacy

Similar to the process 300, subsampling can be used in the process 800 for differential privacy. In step 808 of the process 800, the aggregation serves 180-A and 180-B can use similar subsampling techniques as in steps 314 and 316 of the process 300 to introduce noise to the total conversion values $\Sigma$V$_i$. In addition, the aggregation servers 180-A and 180-B can add random noise to each conversion value (H($\Sigma$V_, report_domain) prior to sending the conversion reports. For each conversion value (H($\Sigma$V, report_domain), each aggregation server 180-A and 180-B can generate (H(noise$_k$+$\Sigma$V_, report_domain) instead. Both aggregation servers 180-A and 180-B can generate consistent noise (noise$_k$) by initializing a random number generator using a common seed that the aggregation servers 180-A and 180-B jointly derive, e.g., using the Diffie-Hellman protocol.

Additional User Privacy Protection for Cross-Device Measurements

As described above, when determining impression and conversion counts and conversion values across multiple devices, the unique identifier (ID) can be information about the user or based on such information, e.g., a crypto hash of the user's e-mail address. Using the probabilistic encryption described above for the impression data (ImpressionData$_{3p}$) and the conversion data (ConversionData$_{3p}$), the aggregation servers 180-A and 180-B can determine some number of conversions for a user, but nothing about the impressions or conversions themselves. But, the aggregation servers 180-A and 180-B can detect that the user has some online activity.

Figure 9:
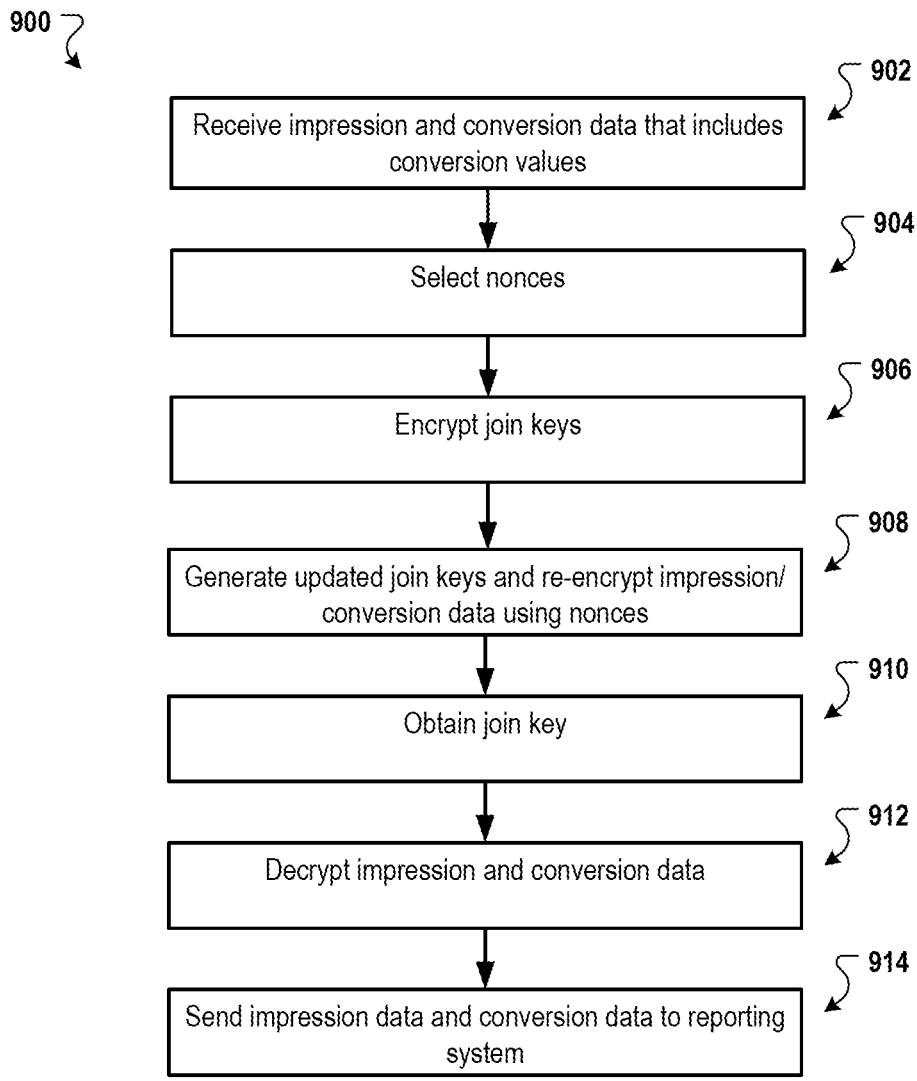
FIG. 9 is a flow diagram that illustrates an example process for determining aggregated conversion data.

FIG. 9 is a flow diagram that illustrates an example process 900 for determining aggregated conversion data. The process 900 can be performed by the aggregation servers 180-A and 180-B.

Impression and conversion data is received (902). For example, as described above, the aggregation server 180-A can receive the impression data and the aggregation server 180-B can receive the conversion data, e.g., in batches, from client devices.

In this example, the impression data can be in the form of {H(CryptoHash(ID, dc_destination, report_domain), S$_{time}$), ImpressionData$_{3p}$} for each impression of a digital component. In this example, a crypto hash of the unique identifier (ID), the destination (dc_destination), and the reporting domain is encrypted using an additive homomorphic public key encryption technique H and the public key S$_{time}$ of the time server 192. This encrypted crypto hash serves as the impression join key. The impression data also includes the thrice-encrypted impression data (ImpressionData$_{3p}$), which can be encrypted as described above with reference to FIG. 2.

The conversion data can be in the form of {H(CryptoHash (ID, dc_destination, report_domain), S$_{time}$), ConversionData$_{3p}$} for each conversion of a digital component. In this example, a crypto hash of the unique identifier (ID), the destination (dc_destination), and the reporting domain is encrypted using an additive homomorphic public key encryption technique H and the public key S$_{time}$ of the time server 192. This encrypted crypto hash serves as the conversion join key. The conversion data also includes the thrice-encrypted conversion data (ConversionData$_{3p}$), which can be encrypted as described above with reference to FIG. 2. Without colluding with the time server 192, neither aggregation server 180-A or 180-B can recover the Crypto-Hash(ID, dc_destination, report_domain) or make sense out of H(CryptoHash( . . . )) due to the probabilistic nature of the encryption technique H.

Nonces are selected (904). Before performing the MPC process to decrypt the impression and conversion data, the aggregation servers 180-A and 180-B can each select a nonce. The aggregation server 180-A can select a nonce nonce$_i$ and the aggregation server 180-B can select a nonce nonce$_c$. Both aggregation servers 180-A and 180-B can keep its respective nonce confidentially.

The join keys are encrypted (906). For example, the aggregation server 180-A can encrypt the join keys H(CryptoHash( . . . )) in the received impression data using commutative encryption and its selected encryption key Key$_{i1}$, as described above with respect to step 306 of the process 300. The aggregation server 180-A can then send, for each impression, a pair: {H(CryptoHash(ID, dc_destination, report_domain)+nonce$_i$, S$_{time}$), ImpressionData$_{3p}$} to the aggregation server 180-B.

Similarly, the aggregation server 180-B can encrypt the join keys H(CryptoHash( . . . )) in the received impression data using commutative encryption and its selected encryption key Key$_{c1}$, as described above with respect to step 308 of the process 300. The aggregation server 180-B can then send, for each impression, a pair: {H(CryptoHash(ID, dc_destination, report_domain)+nonce$_c$, S$_{time}$), ConversionData$_{3p}$} to the aggregation server 180-A.

Updated join keys are generated (908). For each received pair of encrypted join key and thrice-encrypted conversion data {H(CryptoHash(ID, dc_destination, report_domain)+nonce$_i$, S$_{time}$), ImpressionData$_{3p}$}, the aggregation server 180-A re-encrypts the join key and the conversion data. As described above with reference to step 310 of the process 300, the aggregation server 180-A can decrypt the thrice-encrypted conversion data (ConversionData$_{3p}$) using its private key (the private key corresponding to public key S$_i$) to recover the twice-encrypted conversion data (ConversionData$_2$). The aggregation server 180-A can then re-encrypt the twice-encrypted conversion data (ConversionData$_2$) using its selected encryption key Key$_{i2}$.

The aggregation server 180-A can also generate an updated join key for each received pair of encrypted join key and thrice-encrypted conversion data H(CryptoHash(ID, dc_destination, report_domain)+nonce$_c$, S$_{time}$). For example, the aggregation server 180-A can generate an updated join key H(CryptoHash(ID, dc_destination, report_domain) nonce$_c$+nonce$_i$, S$_{time}$). The aggregation server 180-A can then send, to the aggregation server 180-B, the pairs {H(CryptoHash(ID, dc_destination, report_domain) nonce$_c$+nonce$_i$, S$_{time}$), ConversionData$_{3p}$}.

Similarly, as described above with reference to step 312 of the process 300, the aggregation server 180-B can decrypt the thrice-encrypted impression data (ImpressionData$_{3p}$) using its private key (the private key corresponding to public key S$_c$) to recover the twice-encrypted impression data (ImpressionData$_2$). The aggregation server 180-B can then re-encrypt the twice-encrypted impression data (ImpressionData$_2$) using its selected encryption key Key$_{c2}$.

The aggregation server 180-B can also generate an updated join key for each received pair of encrypted join key and thrice-encrypted impression data H(CryptoHash(ID, dc_destination, report_domain)+nonce$_i$, S$_{time}$). For example, the aggregation server 180-B can generate an updated join key H(CryptoHash(ID, dc_destination, report_domain) nonce$_i$+nonce$_c$, S$_{time}$). The aggregation server 180-B can then send, to the aggregation server 180-A, the pairs {H(CryptoHash(ID, dc_destination, report_domain) nonce$_i$+nonce$_c$, S$_{time}$), ImpressionData$_{3p}$}.

Join keys are obtained (910). For example, each aggregation server 180-A and 180-B can interact with the time server 192 to obtain joins keys for each piece of impression data and each piece of conversion data. The aggregation server 180-A can send, to the time server 192, H(CryptoHash(ID, dc_destination, report_domain)+nonce$_i$+nonce$_c$, S$_{time}$) for each piece of impression data and each piece of conversion data. The time server 192 can decrypt and re-encrypt H(CryptoHash(ID, dc_destination, report_domain)+nonce$_i$+nonce$_c$, S$_{time}$) using a deterministic symmetric key encryption technique and an encryption key selected for the current batch process. The result of the re-encrypt is a join key to join the impression data (ImpressionData$_{3p}$) with corresponding conversion data (ConversionData$_{3p}$). The aggregation server 180-B can interact with the time server 192 in a similar manner to get the same join keys.

The impression and conversion data is decrypted (912). With the join keys obtained, the aggregation servers 180-A and 180-B can perform the rest of the MPC process to decrypt the impression and conversion data, as described above in steps 314-328 of the process 300.

Decrypted impression and conversion data is sent to the reporting system (914). For example, each aggregation server 180-A and 180-B can send conversion reports to the respective reporting systems, as described above with reference to steps 330 and 332 of the process 300.

To provide even more privacy protection, a random or pseudo-random number can be used at the unique identifier (ID) in some implementations. This random or pseudo-random number can be based on the unique identifier (ID). For example, the random number can be based on HMAC$_{SHA256}$(e-mail address, email_provider_private_key). In this example, the random number used for the unique identifier (ID) in the keys described above can be an HMAC of the user's e-mail address (or other user information) using a private key of the e-mail provider (or other user authorization entity). The e-mail provider (or user authorization entity) can then synchronize the random number for the unique identifier (ID) to all devices and applications of the user. This random number can then be used in place of the unique identifier (ID) when reporting impression and conversion data to the aggregation servers 180-A and 180-B.

Figure 10:
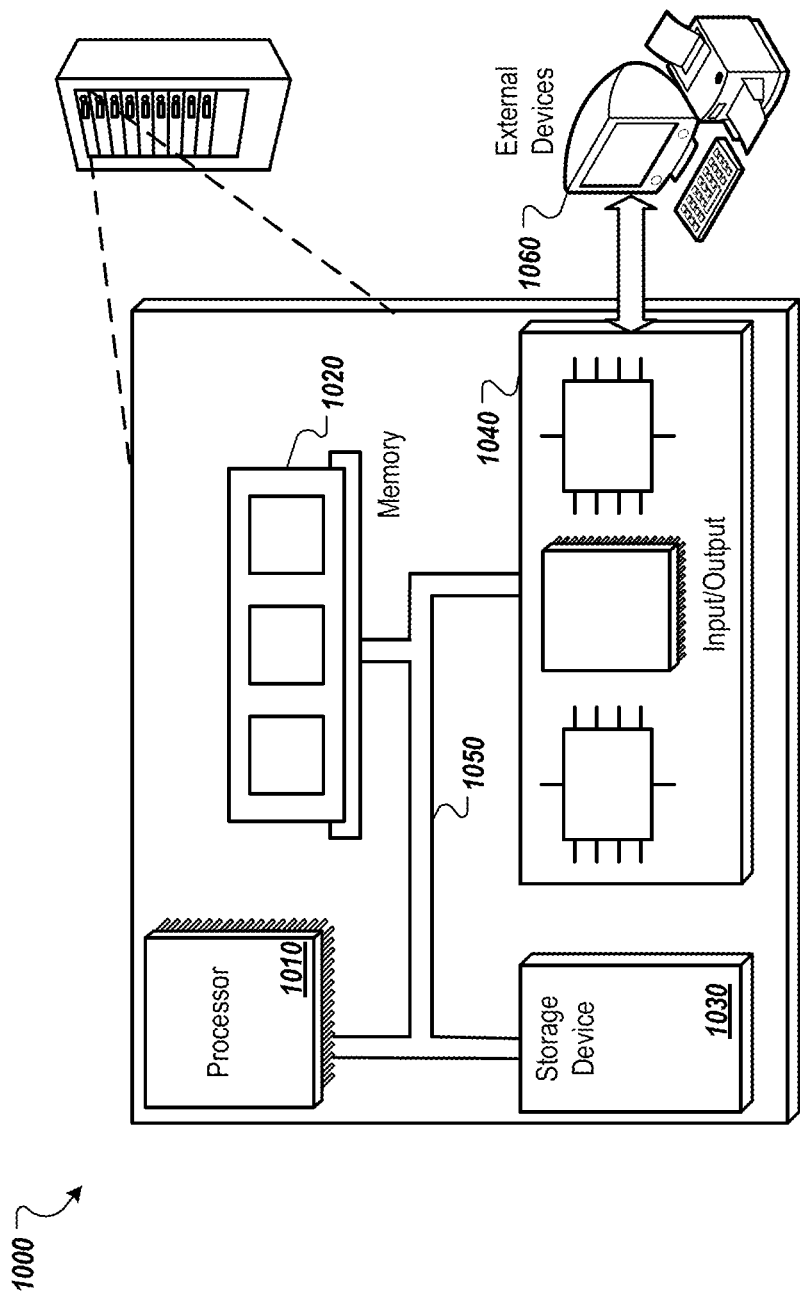
FIG. 10 is a block diagram of an example computer system.

FIG. 10 is a block diagram of an example computer system 1000 that can be used to perform operations described above. The system 1000 includes a processor 1010, a memory 1020, a storage device 1030, and an input/output device 1040. Each of the components 1010, 1020, 1030, and 1040 can be interconnected, for example, using a system bus 1050. The processor 1010 is capable of processing instructions for execution within the system 1000. In some implementations, the processor 1010 is a single-threaded processor. In another implementation, the processor 1010 is a multi-threaded processor. The processor 1010 is capable of processing instructions stored in the memory 1020 or on the storage device 1030.

The memory 1020 stores information within the system 1000. In one implementation, the memory 1020 is a computer-readable medium. In some implementations, the memory 1020 is a volatile memory unit. In another implementation, the memory 1020 is a non-volatile memory unit.

The storage device 1030 is capable of providing mass storage for the system 1000. In some implementations, the storage device 1030 is a computer-readable medium. In various different implementations, the storage device 1030 can include, for example, a hard disk device, an optical disk device, a storage device that is shared over a network by multiple computing devices (e.g., a cloud storage device), or some other large capacity storage device.

The input/output device 1040 provides input/output operations for the system 1000. In some implementations, the input/output device 1040 can include one or more of a network interface devices, e.g., an Ethernet card, a serial communication device, e.g., and RS-232 port, and/or a wireless interface device, e.g., and 802.11 card. In another implementation, the input/output device can include driver devices configured to receive input data and send output data to external devices 1060, e.g., keyboard, printer and display devices. Other implementations, however, can also be used, such as mobile computing devices, mobile communication devices, set-top box television client devices, etc.

Although an example processing system has been described in FIG. 10, implementations of the subject matter and the functional operations described in this specification can be implemented in other types of digital electronic circuitry, or in computer software, firmware, or hardware, including the structures disclosed in this specification and their structural equivalents, or in combinations of one or more of them.

Embodiments of the subject matter and the operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer programs, i.e., one or more modules of computer program instructions, encoded on computer storage media (or medium) for execution by, or to control the operation of, data processing apparatus. Alternatively, or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate physical components or media (e.g., multiple CDs, disks, or other storage devices).

The operations described in this specification can be implemented as operations performed by a data processing apparatus on data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing. The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an internetwork (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some embodiments, a server transmits data (e.g., an HTML page) to a client device (e.g., for purposes of displaying data to and receiving user input from a user interacting with the client device). Data generated at the client device (e.g., a result of the user interaction) can be received from the client device at the server.

While this specification contains many specific implementation details, these should not be construed as limitations on the scope of any inventions or of what may be claimed, but rather as descriptions of features specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A computer-implemented method, comprising:
receiving, by a first aggregation server and from each of multiple client devices, impression data that includes, for each impression of a digital component recorded by the client device, (i) a first join key that is based on a first unique identifier for the client device or an application on the client device at which the impression occurred, (ii) encrypted impression data that has been encrypted using a first public key of the first aggregation server and using a second public key of a second aggregation server different from the first aggregation server, and (iii) encrypted impression time data that indicates a time at which the impression occurred;
receiving, by the second aggregation server and from each of at least a portion of the multiple client devices, conversion data that includes, for each conversion recorded by the client device, (i) a second join key that is based on a second unique identifier for the client device or an application on the client device at which the conversion occurred and (ii) a second value comprising encrypted conversion data that has been encrypted using the first public key and the second public key, and (iii) encrypted conversion time data that indicates a time at which the conversion occurred;
performing, by the first aggregation server and the second aggregation server, a multi-party computation process to generate chronological sequences of encrypted impression data and encrypted conversion data and to decrypt the encrypted impression data and the encrypted conversion data, including:
identifying, based on the first join keys and the second join keys, groups of encrypted conversion data and corresponding encrypted impression data; and
ordering, for each chronological sequence, the encrypted conversion data and the corresponding encrypted impression data based on the encrypted impression time data and the encrypted conversion time data; and
decrypting the impression data and the conversion data for each sequence of encrypted impression data and conversion data in multiple stages using a first private key that corresponds to the first public key and a second private key that corresponds to the second public key.

2. The computer-implemented method of claim 1, wherein the encrypted impression time data is encrypted using the first public key and the second public key.

3. The computer-implemented method of claim 2, wherein the encrypted impression time data comprises an encrypted version of a sum of the time at which the impression occurred and a clock skew of the client device at which the impression occurred.

4. The method of claim 3, wherein the sum of the time at which the impression occurred and the clock skew of the client device at which the impression occurred is encrypted using homomorphic, additive, probabilistic public key encryption.

5. The computer-implemented method of claim 1, wherein the encrypted conversion time data is encrypted using the first public key and the second public key.

6. The computer-implemented method of claim 5, wherein the encrypted conversion time data comprises an encrypted version of a sum of the time at which the conversion occurred and a clock skew of the client device at which the conversion occurred.

7. The method of claim 6, wherein the sum of the time at which the conversion occurred and the clock skew of the client device at which the conversion occurred is encrypted using homomorphic, additive, probabilistic public key encryption.

8. The method of claim 1, further comprising, for each chronological sequence of encrypted impression data and encrypted conversion data, attributing credit for a conversion in the encrypted conversion data to each impression of the encrypted impression data based at least in part on the chronological sequence of encrypted impression data and encrypted conversion data.

9. The method of claim 1, wherein performing the multi-party computation process comprises:
for each impression:
encrypting, by the first aggregation server, the first join key;
sending, by the first aggregation server and to the second aggregation server, a tuple comprising the encrypted first join key, the encrypted impression data, and the encrypted impression time data; and
for each conversion:
encrypting, by the second aggregation server, the second join key; and
sending, by the second aggregation server and to the first aggregation server, a tuple comprising the encrypted second join key, the encrypted conversion data, and the encrypted conversion time data.

10. The method of claim 9, wherein performing the multi-party computation process comprises:
decrypting, by the first aggregation server, each encrypted conversion time data;
determining, by the first aggregation server, a first time skew value;
generated second encrypted conversion time data by encrypting a sum of the time at which the conversion occurred, a clock skew of the client device at which the conversion occurred, and the first time skew value;
determining, by the first aggregation server, for each unique encrypted conversion data, a number of unique second join keys; and
filtering, from a set of encrypted conversion data received by the first aggregation server, each encrypted conversion data for which the number of unique second join keys is less than a threshold; and
providing, for each remaining encrypted conversion data in the set of encrypted conversion data, a tuple of data that includes the second join key for the encrypted conversion data, the encrypted conversion data, and the second encrypted conversion time data.

11. The method of claim 10, performing the multi-party computation process comprises:
decrypting, by the second aggregation server, each encrypted impression time data;
determining, by the second aggregation server, a second time skew value;
generated second encrypted impression time data by encrypting a sum of the time at which the impression occurred, a clock skew of the client device at which the impression occurred, and the second time skew value;
determining, by the second aggregation server, for each unique encrypted conversion data, a number of unique first join keys;
filtering, from a set of encrypted impression data received by the second aggregation server, each encrypted impression data for which the number of unique first join keys is less than a threshold; and
providing, for each remaining encrypted conversion data in the set of encrypted impression data, a tuple of data that includes the first join key for the encrypted impression data, the encrypted conversion data, and the second encrypted impression time data.

12. A non-transitory computer-readable medium comprising instructions that, when executed by a processor, cause the processor to perform operations comprising:
receiving, by a first aggregation server and from each of multiple client devices, impression data that includes, for each impression of a digital component recorded by the client device, (i) a first join key that is based on a first unique identifier for the client device or an application on the client device at which the impression occurred, (ii) encrypted impression data that has been encrypted using a first public key of the first aggregation server and using a second public key of a second aggregation server different from the first aggregation server, and (iii) encrypted impression time data that indicates a time at which the impression occurred;
receiving, by the second aggregation server and from each of at least a portion of the multiple client devices, conversion data that includes, for each conversion recorded by the client device, (i) a second join key that is based on a second unique identifier for the client device or an application on the client device at which the conversion occurred and (ii) a second value comprising encrypted conversion data that has been encrypted using the first public key and the second public key, and (iii) encrypted conversion time data that indicates a time at which the conversion occurred;
performing, by the first aggregation server and the second aggregation server, a multi-party computation process to generate chronological sequences of encrypted impression data and encrypted conversion data and to decrypt the encrypted impression data and the encrypted conversion data, including:
identifying, based on the first join keys and the second join keys, groups of encrypted conversion data and corresponding encrypted impression data; and
ordering, for each chronological sequence, the encrypted conversion data and the corresponding encrypted impression data based on the encrypted impression time data and the encrypted conversion time data; and decrypting the impression data and the conversion data for each sequence of encrypted impression data and conversion data in multiple stages using a first private key that corresponds to the first public key and a second private key that corresponds to the second public key.

13. A system, comprising:

one or more processors; and one or more computer-readable media storing instructions that, when executed by the one or more processors, cause the one or more processors to perform operations comprising:

receiving, by a first aggregation server and from each of multiple client devices, impression data that includes, for each impression of a digital component recorded by the client device, (i) a first join key that is based on a first unique identifier for the client device or an application on the client device at which the impression occurred, (ii) encrypted impression data that has been encrypted using a first public key of the first aggregation server and using a second public key of a second aggregation server different from the first aggregation server, and (iii) encrypted impression time data that indicates a time at which the impression occurred;

receiving, by the second aggregation server and from each of at least a portion of the multiple client devices, conversion data that includes, for each conversion recorded by the client device, (i) a second join key that is based on a second unique identifier for the client device or an application on the client device at which the conversion occurred and (ii) a second value comprising encrypted conversion data that has been encrypted using the first public key and the second public key, and (iii) encrypted conversion time data that indicates a time at which the conversion occurred;

performing, by the first aggregation server and the second aggregation server, a multi-party computation process to generate chronological sequences of encrypted impression data and encrypted conversion data and to decrypt the encrypted impression data and the encrypted conversion data, including:

identifying, based on the first join keys and the second join keys, groups of encrypted conversion data and corresponding encrypted impression data; and ordering, for each chronological sequence, the encrypted conversion data and the corresponding encrypted impression data based on the encrypted impression time data and the encrypted conversion time data; and decrypting the impression data and the conversion data for each sequence of encrypted impression data and conversion data in multiple stages using a first private key that corresponds to the first public key and a second private key that corresponds to the second public key.

14. The system of claim 13, wherein the encrypted impression time data is encrypted using the first public key and the second public key.

15. The system of claim 14, wherein the encrypted impression time data comprises an encrypted version of a sum of the time at which the impression occurred and a clock skew of the client device at which the impression occurred.

16. The system of claim 15, wherein the sum of the time at which the impression occurred and the clock skew of the client device at which the impression occurred is encrypted using homomorphic, additive, probabilistic public key encryption.

17. The system of claim 13, wherein the encrypted conversion time data is encrypted using the first public key and the second public key.

18. The system of claim 17, wherein the encrypted conversion time data comprises an encrypted version of a sum of the time at which the conversion occurred and a clock skew of the client device at which the conversion occurred.

19. The system of claim 18, wherein the sum of the time at which the conversion occurred and the clock skew of the client device at which the conversion occurred is encrypted using homomorphic, additive, probabilistic public key encryption.

20. The system of claim 13, wherein the operations comprise, for each chronological sequence of encrypted impression data and encrypted conversion data, attributing credit for a conversion in the encrypted conversion data to each impression of the encrypted impression data based at least in part on the chronological sequence of encrypted impression data and encrypted conversion data.

* * * * *